US012581388B2

(12) United States Patent
Karmi et al.

(10) Patent No.: US 12,581,388 B2
(45) Date of Patent: Mar. 17, 2026

(54) DYNAMIC PATH SELECTION TECHNIQUES FOR WIRELESS CONNECTIVITY

(71) Applicant: QUALCOMM Incorporated, San Diego, CA (US)

(72) Inventors: Gad Karmi, Davis, CA (US); Mark Bapst, South Barrington, IL (US); Bibhu Mohanty, Del Mar, CA (US); Jay Rodney Walton, Waban, MA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/178,356

(22) Filed: Mar. 3, 2023

(65) Prior Publication Data

US 2024/0298238 A1 Sep. 5, 2024

(51) Int. Cl.
| | |
|---|---|
| *H04W 40/12* | (2009.01) |
| *H04W 40/22* | (2009.01) |
| *H04W 40/24* | (2009.01) |
| *H04W 84/12* | (2009.01) |

(52) U.S. Cl.
CPC .......... *H04W 40/12* (2013.01); *H04W 40/22* (2013.01); *H04W 40/246* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2002/0150046 A1* | 10/2002 | Dubuc | ................ | H04L 12/5602 370/231 |
| 2006/0209882 A1 | 9/2006 | Han et al. | | |
| 2010/0091669 A1* | 4/2010 | Liu | ........................ | H04L 45/20 370/252 |
| 2011/0066915 A1* | 3/2011 | Arye | ..................... | H04L 1/0017 714/752 |

(Continued)

OTHER PUBLICATIONS

International Search Report and Written Opinion—PCT/US2024/010526—ISA/EPO—Apr. 17, 2024.

*Primary Examiner* — Clemence S Han
(74) *Attorney, Agent, or Firm* — Holland & Hart LLP/Qualcomm

(57) ABSTRACT

This disclosure provides methods, components, devices, and systems for wireless communication. Some aspects more specifically relate to dynamic path selection for wireless connectivity. An access point (AP) may receive communication link information and device status information from cellular-enabled devices in a wireless local area network (WLAN). The communication link information may indicate path metrics (such as link quality information) associated with respective connections between the cellular-enabled devices and a communication network (such as the Internet). The device status information may indicate operational metrics associated with the cellular-enabled devices (such as battery status information or cellular subscription information). If, for example, the performance of a default connection between the AP and the communication network deteriorates, the AP may select one of the cellular-enabled devices to relay wireless communications between the communication network and the AP in accordance with the communication link information and the device status information.

30 Claims, 9 Drawing Sheets

(56)          References Cited

U.S. PATENT DOCUMENTS

| | | | |
|---|---|---|---|
| 2013/0044669 A1 | 2/2013 | Song et al. | |
| 2013/0176934 A1 | 7/2013 | Malladi et al. | |
| 2014/0341109 A1 | 11/2014 | Cartmell et al. | |
| 2017/0086103 A1 | 3/2017 | Neves et al. | |
| 2017/0215121 A1* | 7/2017 | Condeixa | H04W 4/40 |
| 2018/0027433 A1 | 1/2018 | Elliott et al. | |
| 2019/0268335 A1 | 8/2019 | Targali | |
| 2020/0008248 A1 | 1/2020 | Beck | |
| 2020/0145923 A1* | 5/2020 | Park | H04W 40/244 |
| 2021/0211961 A1* | 7/2021 | Bonnet | H04W 36/26 |
| 2024/0298241 A1 | 9/2024 | Karmi et al. | |

* cited by examiner

Figure 5:
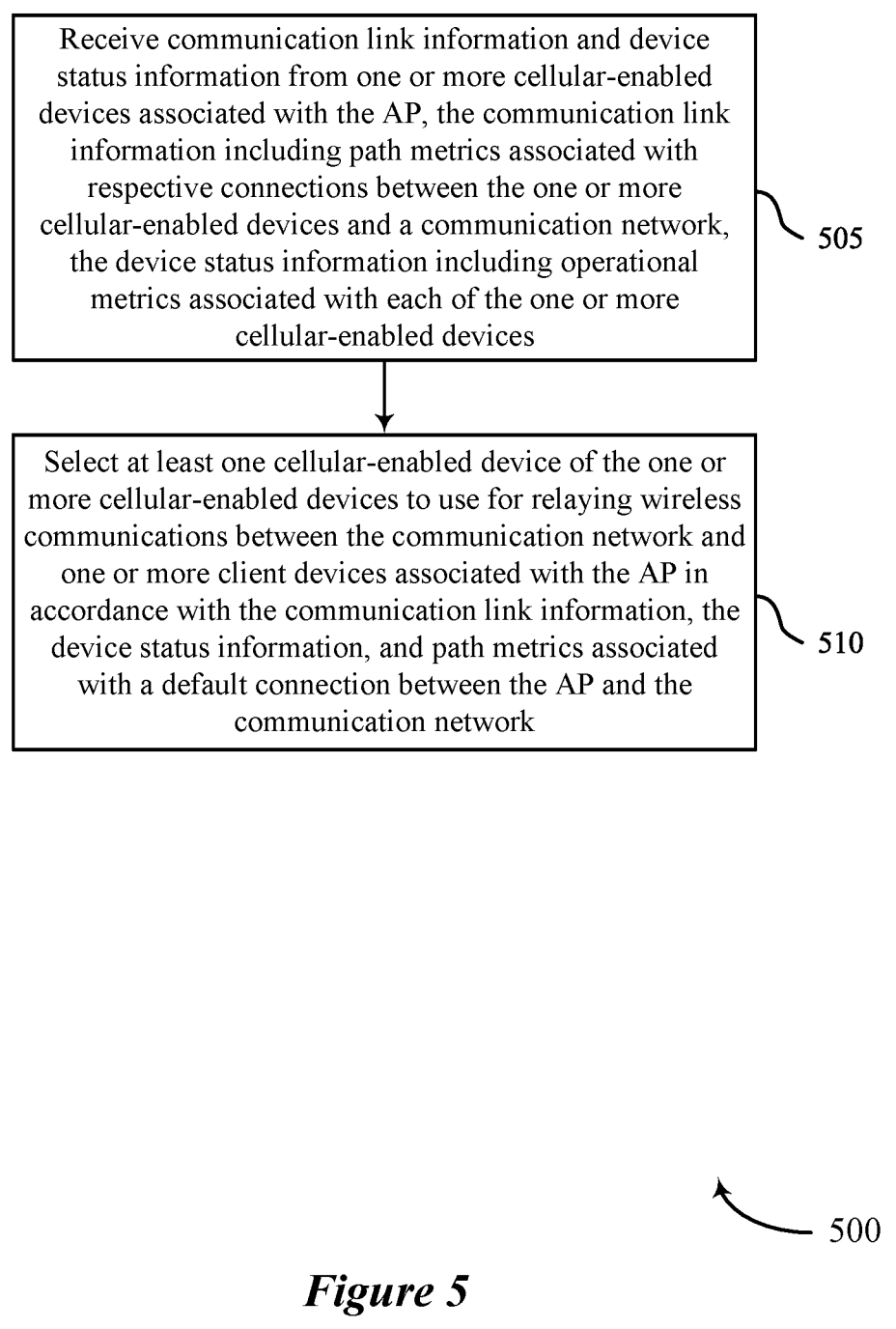

Receive communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices

505

Select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network

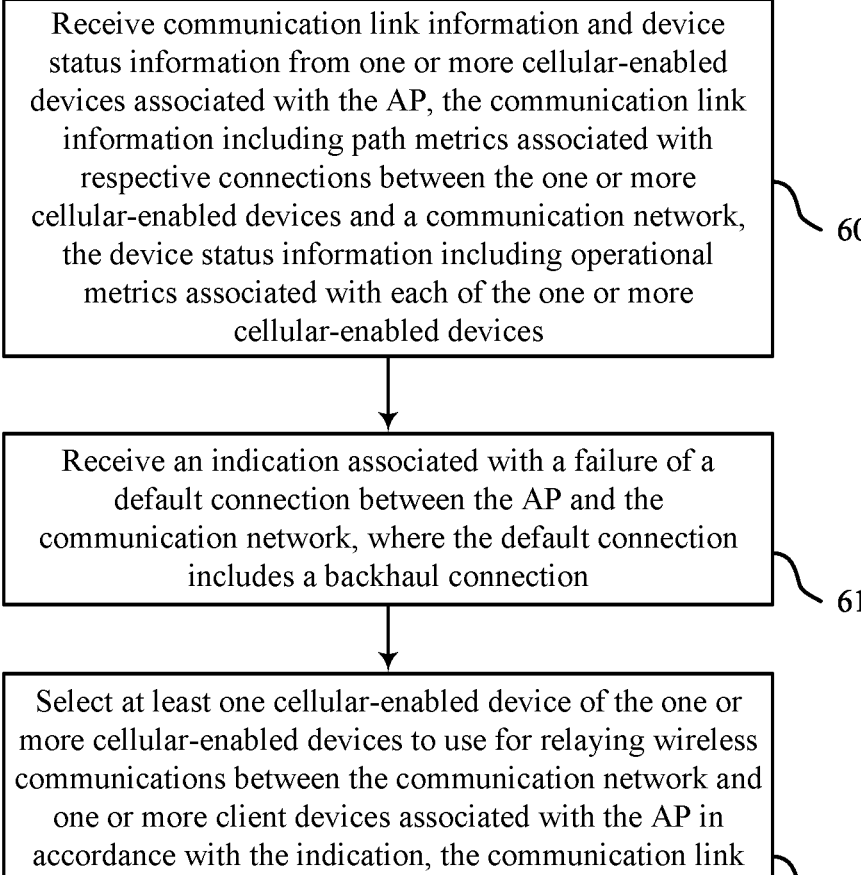

Receive communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices

605

Receive an indication associated with a failure of a default connection between the AP and the communication network, where the default connection includes a backhaul connection

610

Select at least one cellular-enabled device of the one or more cellular-enabled devices to use for relaying wireless communications between the communication network and one or more client devices associated with the AP in accordance with the indication, the communication link information, the device status information, and path metrics associated with the default connection between the AP and the communication network

Figure 7:
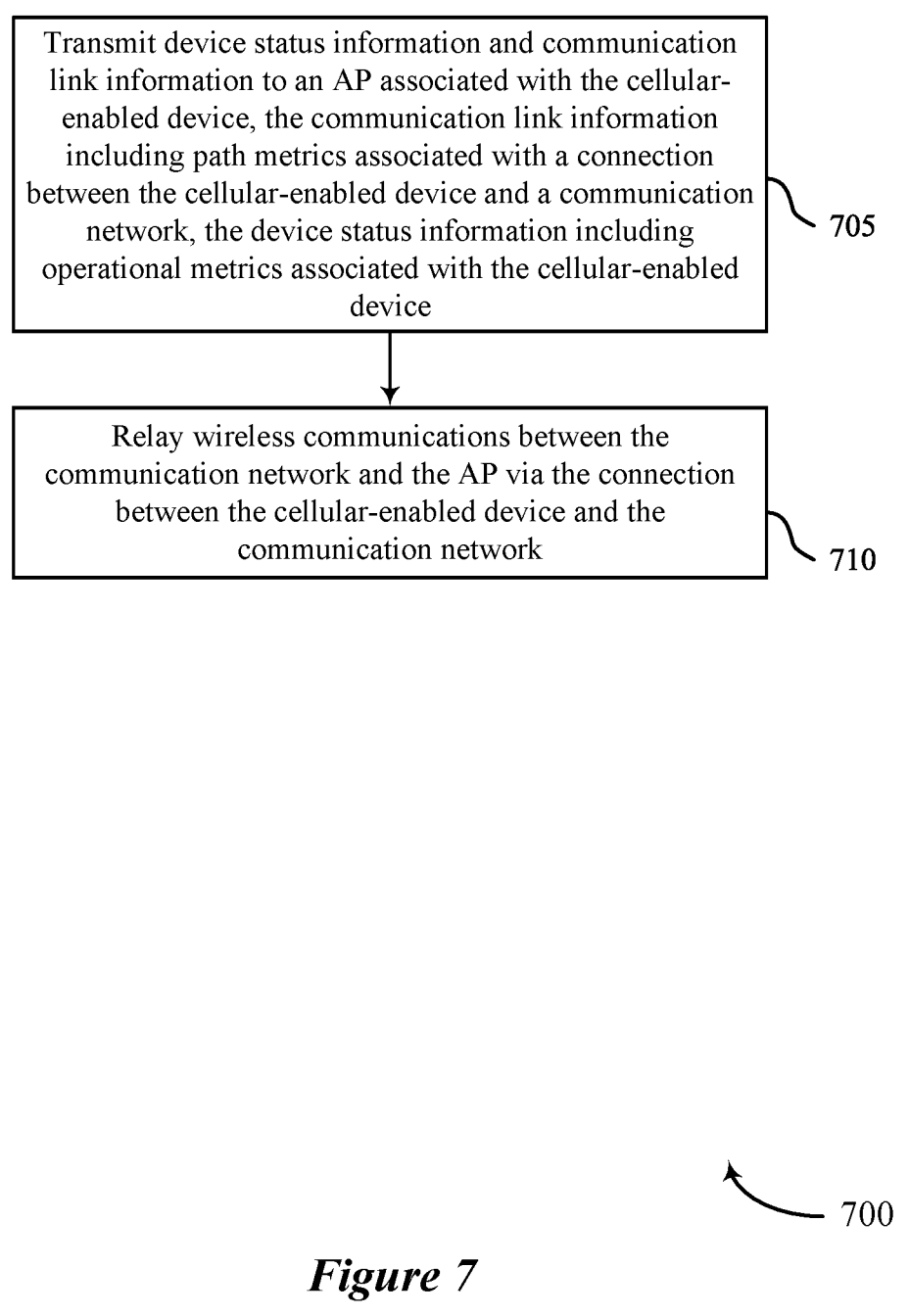

Transmit device status information and communication link information to an AP associated with the cellular-enabled device, the communication link information including path metrics associated with a connection between the cellular-enabled device and a communication network, the device status information including operational metrics associated with the cellular-enabled device

705

Relay wireless communications between the communication network and the AP via the connection between the cellular-enabled device and the communication network

DYNAMIC PATH SELECTION TECHNIQUES FOR WIRELESS CONNECTIVITY

TECHNICAL FIELD

This disclosure relates generally to wireless communication, and more specifically, to dynamic path selection techniques for wireless connectivity.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLAN implementations, one or more STAs may access the Internet or another wide-area network (WAN) via a wireless connection to an AP. A failure or degradation of service at a primary path between the AP and the Internet may propagate into an interruption or degradation of Internet service at the STAs.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication at an access point (AP). The apparatus includes one or more interfaces configured to obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices. The apparatus further includes a processing system configured to select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Another innovative aspect of the subject matter described in this disclosure can be implemented in an apparatus for wireless communication at a cellular-enabled device. The apparatus includes one or more interfaces configured to output device status information and communication link information to an AP associated with the cellular-enabled device, the communication link information including path metrics associated with a connection between the cellular-enabled device and a communication network, the device status information including operational metrics associated with the cellular-enabled device. The one or more interfaces are further configured to relay wireless communications between the communication network and the AP via the connection between the cellular-enabled device and the communication network.

Another innovative aspect of the subject matter described in this disclosure can be implemented in a method for wireless communication at an AP. The method includes receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices. The method further includes selecting at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Another innovative aspect of the subject matter described in this disclosure can be implemented in a method for wireless communication at a cellular-enabled device. The method includes transmitting device status information and communication link information to an AP associated with the cellular-enabled device, the communication link information including path metrics associated with a connection between the cellular-enabled device and a communication network, the device status information including operational metrics associated with the cellular-enabled device. The method further includes relaying wireless communications between the communication network and the AP via the connection between the cellular-enabled device and the communication network.

Another innovative aspect of the subject matter described in this disclosure can be implemented in an apparatus for wireless communication at an AP. The apparatus includes means for receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices. The apparatus further includes means for selecting at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Another innovative aspect of the subject matter described in this disclosure can be implemented in an apparatus for wireless communication at a cellular-enabled device. The apparatus includes means for transmitting device status information and communication link information to an AP associated with the cellular-enabled device, the communication link information including path metrics associated with a connection between the cellular-enabled device and a communication network, the device status information including operational metrics associated with the cellular-enabled device. The apparatus further includes means for relaying wireless communications between the communication network and the AP via the connection between the cellular-enabled device and the communication network.

Another innovative aspect of the subject matter described in this disclosure can be implemented in a non-transitory computer-readable medium storing code for wireless communication at an AP. The code includes instructions executable by a processor to obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices. The instructions are further executable by the processor to select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Another innovative aspect of the subject matter described in this disclosure can be implemented in a non-transitory computer-readable medium storing code for wireless communication at a cellular-enabled device. The code includes instructions executable by a processor to output device status information and communication link information to an AP associated with the cellular-enabled device, the communication link information including path metrics associated with a connection between the cellular-enabled device and a communication network, the device status information including operational metrics associated with the cellular-enabled device. The instructions are further executable by the processor to relay wireless communications between the communication network and the AP via the connection between the cellular-enabled device and the communication network.

Some examples of the methods, apparatuses, and non-transitory computer readable media further include operations, features, means, or instructions for receiving an indication associated with a failure of the default connection between the AP and the communication network, where at least one cellular-enabled device is selected in accordance with the indication, and where the default connection includes a backhaul connection.

In some examples of the methods, apparatuses, and non-transitory computer readable media, the failure includes a connectivity failure of the backhaul connection between the AP and the communication network, a performance failure of the backhaul connection, or both, and the performance failure corresponds to a security of the backhaul connection, a reliability of the backhaul connection, a throughput of the backhaul connection, a latency of the backhaul connection, or a combination thereof.

Some examples of the methods, apparatuses, and non-transitory computer readable media further include operations, features, means, or instructions for steering the wireless communications according to a respective priority of each of the one or more cellular-enabled devices, a respective priority of each of the one or more client devices, a respective priority of each service running on the one or more client devices, or a combination thereof.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 5-7 show flowcharts illustrating example processes performable by wireless communication devices that support dynamic path selection techniques for wireless connectivity.

Like reference numbers and designations in the various drawings indicate like elements.

DETAILED DESCRIPTION

Figure 1:
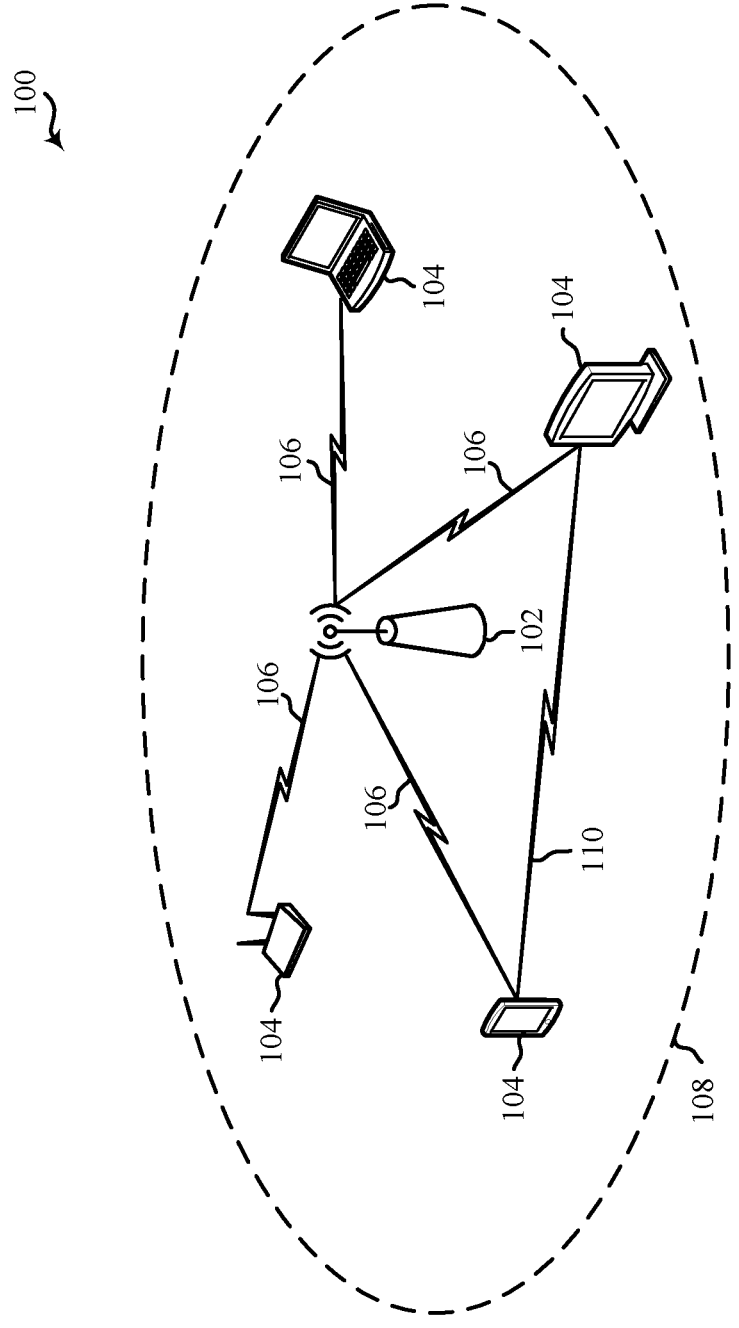
FIG. 1 shows a pictorial diagram of an example wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an Internet of Things (IoT) network.

Devices in a WLAN may have a wide range of capabilities. For example, some communication devices may be capable of accessing a communication network (such as the Internet) via a cellular connection, while other communication devices may access the communication network via a backhaul connection between an access point (AP) and the communication network. In some systems, however, communication devices without cellular capabilities may be unable to access the communication network if the backhaul connection between the AP and the communication network goes down. Furthermore, access via backhaul can be either completely interrupted in the case of an outright outage or severely degraded if the backhaul degrades (such as if a 5G backhaul experiences a partial occlusion). Thus, in the event of a backhaul outage, users may be unable to access the communication network without manually tethering to nearby cellular-enabled devices, using a cellular hotspot, or connecting to a cellular-enabled AP. As described herein, tethering may involve using a cable or other one-to-one connection (such as a Bluetooth connection), while a cellular hotspot may involve using a many-to-one connection (such as a Wi-Fi connection). However, both approaches may result in workflow disruptions, latency, and higher costs.

Various aspects relate generally to wireless communications, and more specifically to dynamic path selection techniques for wireless connectivity. In some implementations, an AP may receive communication link information and device status information from one or more cellular-enabled devices in a WLAN. The communication link information may indicate path metrics (such as link quality information, radio access type information, and connection strength information, among other examples) associated with respective connections between the cellular-enabled devices and a communication network. The device status information may indicate operational metrics associated with the cellular-enabled devices (such as battery status information or cellular subscription information). If, for example, the performance of a default connection (such as a backhaul connection) between the AP and the communication network deteriorates, the AP may select one of the cellular-enabled devices to relay wireless communications between the communication network and the AP in accordance with the communication link information and the device status information.

In some implementations, if a backhaul failure or degradation beyond a threshold is detected, the AP and a cellular-enabled device can mutually discover each other and connect through an application supporting discovery and connectivity establishment mechanism running on both devices. This discovery process may occur prior to detection of a backhaul failure event, thereby expediting the connection establishment upon backhaul failure or degradation. Additionally, or alternatively, a STA being served by the AP may detect the backhaul failure or degradation and instruct the AP to connect to the Internet using a cellular connection provided by the AP or another STA in the BSS. In some implementations, the AP or a STA being served by the AP may predict the backhaul failure by analyzing various metrics (such as decreasing bandwidth or increasing latency), thereby enabling the AP to setup and switch to a cellular connection before the backhaul failure occurs.

Thereafter, the AP can dynamically steer traffic from client devices (such as communication devices without cellular capabilities) to one or more of the cellular-enabled devices according to various path metrics such as link quality, connection strength, battery level, processing capabilities, or security policies. In some implementations, the AP may steer traffic according to user-specified criteria. For example, the AP may steer high-priority traffic flows to nearby cellular-enabled devices, and may avoid steering low-priority traffic flows until the backhaul connection is restored. Additionally, or alternatively, the AP may steer all traffic to or from a client device if one or more traffic streams of the client device are deemed high-priority, or if the client device itself is deemed a high-priority device. However, the dynamic path selection mechanisms of this disclosure can be used even in the absence of a backhaul outage. In some implementations, the AP may establish a multi-path transmission control protocol (MPTCP) connection to improve the reliability and resiliency of traffic flows between client devices and the communication network.

Particular aspects of the subject matter described in this disclosure can be implemented to realize one or more of the following potential advantages. In some implementations, by dynamically selecting a cellular-enabled device to relay wireless communications between the AP and the communication network, the described techniques may be used to attain higher throughput, reduced latency, and greater connection reliability, among other benefits. For example, if a backhaul connection between the AP and the communication network becomes inoperable (or if the performance of an available cellular connection surpasses the performance of the backhaul connection), the AP may automatically steer or redirect traffic from client devices (such as communication devices connected to the AP) to nearby cellular-enabled device(s) with more favorable network conditions, thereby potentially reducing the likelihood of network outages and other connectivity issues adversely affecting the client devices.

Additionally, or alternatively, aspects of the subject matter described in this disclosure may increase the availability of communication systems to end users, where availability is defined as the ratio between mean time between failures (MTBF) and the summation of MTBF and mean time to repair (MTTR). For a given MTBF associated with a backhaul connection, the dynamic traffic steering techniques described herein may reduce MTTR by automating the process of identifying alternate paths to the Internet. Furthermore, when multiple paths to the Internet are available, the techniques described in this disclosure may enable devices to identify and use the most optimal path to connect to the Internet, where optimality is defined using various network-related key performance indicators (KPIs) such as throughput, latency, bandwidth, and signal strength, among other examples.

Aspects of the disclosure are initially described in the context of a wireless communications system, a signaling diagram, network diagrams, and a process flow. Aspects of the disclosure are further illustrated by and described with reference to apparatus diagrams, system diagrams, and flowcharts that relate to dynamic path selection techniques for wireless connectivity.

FIG. 1 shows a pictorial diagram of an example WLAN 100. According to some aspects, the WLAN 100 can be an example of a Wi-Fi network. For example, the WLAN 100 can be a network implementing at least one of the IEEE 802.11 family of wireless communication protocol standards (such as that defined by the IEEE 802.11 2020 specification or amendments thereof including, but not limited to, 802.11ay, 802.11ax, 802.11az, 802.11ba, 802.11bd, 802.11be, 802.11bf, and the 802.11 amendment associated with Wi-Fi 8).

The WLAN 100 may include numerous wireless communication devices such as a wireless AP 102 and multiple wireless stations (STAs) 104. While one AP 102 is shown in FIG. 1, the WLAN 100 also can include multiple APs 102. AP 102 shown in FIG. 1 can represent various different types of APs 102 including (but not limited) to enterprise-level APs 102, single-frequency APs 102, dual-band APs 102, standalone APs 102, software-enabled APs 102 (soft APs 102), and multi-link APs 102. The coverage area and capacity of a cellular network (such as LTE, 5G NR) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad-hoc network (or wireless ad-hoc network). Ad-hoc networks may alternatively be referred to as mesh networks or peer to peer (P2P) networks. In some implementations, ad-hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad-hoc system, one or more of the STAs 104 may assume the role filled by the AP 102 in a BSS. Such a STA 104 may be referred to as a group owner (GO) and may coordinate transmissions within the ad-hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY PDUs (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub bands or frequency channels. For example, PPDUs conforming to the IEEE 802.11n, 802.11ac, 802.11ax and 802.11be standard amendments may be transmitted over the 2.4, 5 GHZ or 6 GHZ bands, each of which is divided into multiple 20 MHZ channels. As such, these PPDUs are transmitted over a physical channel having a threshold bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In accordance with the techniques described herein, the AP 102 may obtain communication link information and device status information from one or more cellular-enabled devices (such as STAs 104 with cellular capabilities) associated with the AP 102. The communication link information may include path metrics associated with respective connections between the one or more cellular-enabled devices and a communication network (such as the Internet or a proximate base station), and the device status information may include operational metrics associated with each of the one or more cellular-enabled devices. Accordingly, the AP 102 may select at least one of the cellular-enabled devices to use for relaying wireless communications between the communication network and one or more client devices (such as STAs 104 without cellular capabilities) associated with the AP in accordance with the communication link information, the device status information, and path metrics associated with a default connection between the AP 102 and the communication network.

Figure 2:
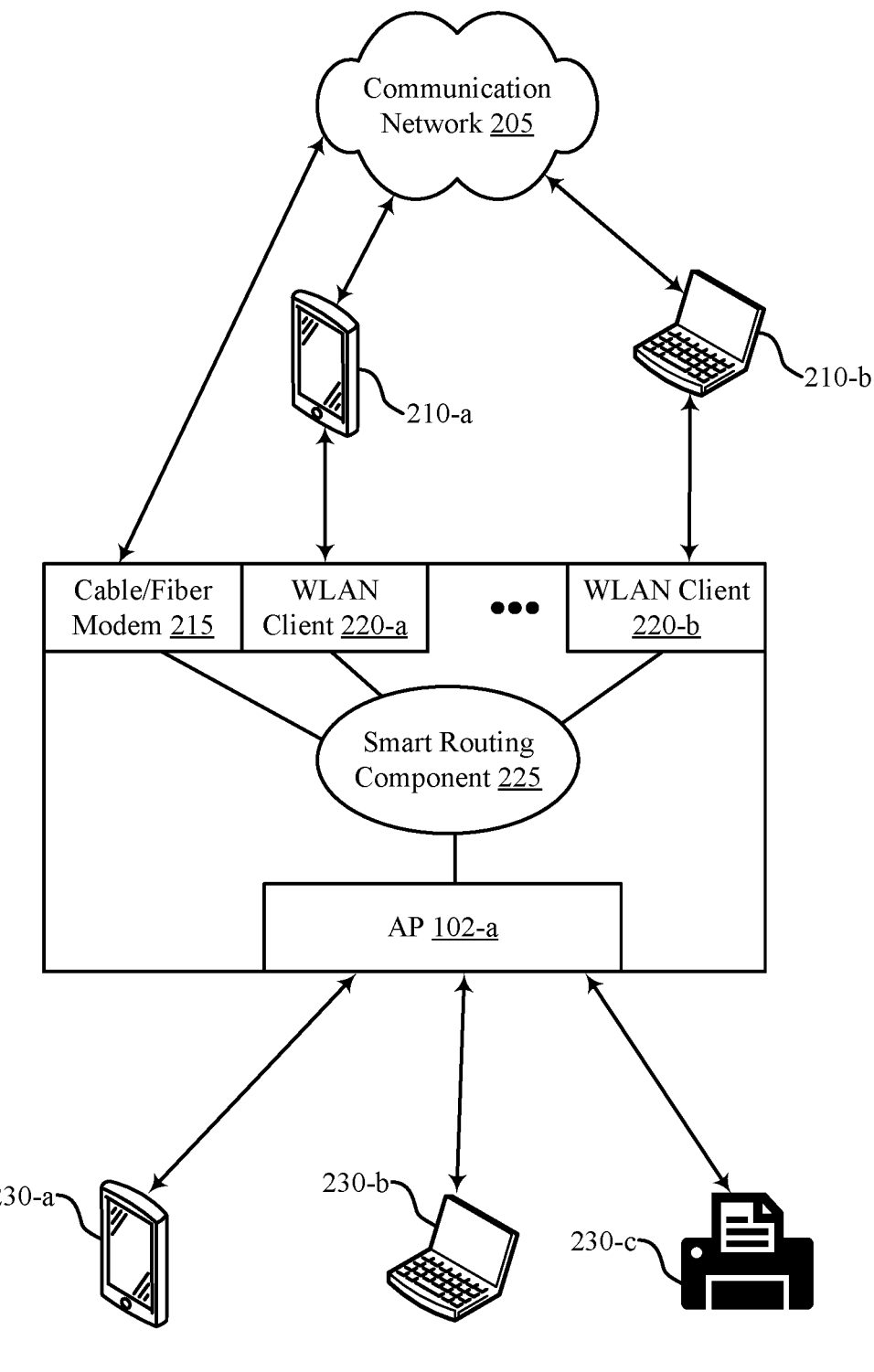
FIG. 2 shows an example signaling diagram that supports dynamic path selection techniques for wireless connectivity.

FIG. 2 shows an example signaling diagram 200 that supports dynamic path selection techniques for wireless connectivity. The signaling diagram 200 may implement or be implemented by aspects of the WLAN 100. For example, the signaling diagram includes an AP 102-*a*, which may be an example of aspects of a wireless AP, such as the AP 102 described with reference to FIG. 1. The signaling diagram 200 also includes cellular-enabled devices 210 and client devices 230, each of which may be an example of aspects of a STA 104 described herein, including with reference to FIG. 1. In the example of FIG. 2, the AP 102-*a* may use a cellular connection between a communication network 205 (such as the Internet) and at least one of the cellular-enabled devices 210 to relay wireless communications between the communication network 205 and the client devices 230 if a backhaul connection between the AP 102-*a* and the communication network 205 is disrupted.

In some home and small business network deployments, routers (such as the AP 102-*a*) may have a single backhaul connection to the communication network 205. Examples of backhaul connections include cable, fiber, and asymmetric digital subscriber line (ADSL) connections. Backhaul connection failures can result in delays, service disruptions, and communication lapses. When a backhaul failure occurs, users may be able to manually tether to or wirelessly join a cellular hotspot. However, tethering (such as by establishing a Universal Serial Bus (USB) connection between two devices) or wirelessly joining a cellular hotspot (such as by establishing a peer-to-peer or STA-AP connection in accordance with Bluetooth or WiFi protocols) can involve manual processes that interrupt a workflow or otherwise disrupt user experience. For example, users of some client devices may have to manually close applications running on client devices before or after connecting to a hotspot to make sure that application data for each client device is correctly routed through the hot spot or tethered and not through a cellular modem of the client device following a backhaul failure. For home and small business deployments, the process of manually tethering or connecting to a hotspot may be repeated for every client device in the deployment, which may disrupt user experience and consume human resources. Furthermore, hotspot or tethering mechanisms may not support traffic steering. Also, some clients may not support a list of preferred WiFi networks and, due to user interface capabilities, or other limited features that may make the process of connecting to an alternative WiFi network (such as a hotspot network) time-consuming.

Some wireless routers with a subscriber identity module (SIM) slot may provide users with an alternative path to the Internet if, for example, a primary backhaul connection is degraded. However, these routers may use a dedicated cellular subscription, and some users may find it cost prohibitive to pay for an additional cellular subscription that is used relatively infrequently. Such routers also may be limited or unable to select which traffic streams are serviced via the cellular connection (which may be bandwidth-limited and potentially more expensive).

The techniques described herein may provide users with an alternative way to access the Internet or another wide-area network in the event of a backhaul outage or service disruption. Some aspects of the present disclosure support dynamic resource discovery at the AP 102-*a*. For example, the AP 102-*a* (such as a router) may discover available cellular paths to the Internet provided by cellular-enabled devices 210 (such as phones, laptops with cellular modems, and hotspots) in a coverage area of the AP 102-*a*, and may use one or more of the cellular-enabled devices 210 to steer traffic (also referred to as data or wireless communications) during a backhaul outage.

The automatic cellular modem discovery and traffic steering techniques described herein (which can be preset or configured by a user) may enable users to re-establish Internet connectivity without manually tethering devices to a phone during an outage, with manual control of what traffic accesses the Internet. Traffic steering can be according to a user-configured prioritization of cellular-enabled devices 210 or on identification and classification of real-time traffic flows within the client devices 230. For example, the AP 102-*a* (more specifically, a smart routing component 225 of the AP 102-*a*) may steer traffic associated with a first application, and may refrain from or avoid steering traffic associated with a second application. Additionally, or alternatively, the AP 102-*a* may steer traffic according to a priority of the client devices 230. For example, the AP 102-*a* may prioritize traffic flows from a client device 230-*a* (such as a high-priority client) over traffic flows from a client device 230-*b* and a client device 230-*c* (such as low-priority clients).

As described herein, the AP 102-*a* may support dynamic cellular modem discovery. For cellular-enabled devices 210 that are running a distributed computing application, device selection can include evaluating parameters such as a link quality between the AP 102-*a* and the cellular-enabled devices 210, a link type (such as NR or LTE) or link quality between the cellular-enabled devices 210 and the communication network 205, charging status information (such as whether the cellular-enabled devices 210 are connected to power or running on battery), battery level information, user-provided cellular subscription information (such as whether a user has an unlimited data plan, a capped data plan, or a plan where cellular usage is charged per byte), calendar information obtained from a calendar information (such as whether a user is likely to leave the house soon), current processor workload information, or client security policies, among other examples.

If the AP 102-*a* is unable to find any cellular-enabled devices 210 running the distributed computing application, the AP 102-*a* may connect to a device with cellular hotspot capabilities. In some implementations, the AP 102-*a* may connect to multiple devices by identifying traffic key performance indicators (such as end-to-end throughput, latency, and jitter) and steering traffic accordingly. The key performance indicators may aid the AP 102-*a* to utilize cellular modems connected to a millimeter wave (mmW) network for high-bandwidth applications. In some implementations, the extent to which the AP 102-*a* can control or manage traffic steering may depend on the operating system (OS) of a device and whether the device is running the distributed computing application. Additionally, or alternatively, the AP 102-*a* may use multiple devices (such as the cellular-enabled device 210-*a* and the cellular-enabled device 210-*b*) to facilitate a proxy MPTCP connection on behalf of client devices 230 with Wi-Fi modems, thereby increasing the reliability of the connection between the client devices 230 and the communication network 205.

In the example of FIG. 2, the AP 102-*a* may use a cable/fiber modem 215 to forward traffic to the communication network 205 via a default backhaul connection. If, for example, the backhaul connection fails, the AP 102-*a* may use one or more physical/logical Wi-Fi modems (such as a WLAN client 220-*a* and a WLAN client 220-*b*) to access cellular-enabled devices 210 with hotspot capabilities. The additional Wi-Fi modems of the AP 102-*a* can be independent modems. Additionally, or alternatively, in some implementations the additional Wi-Fi modems of the AP 102-*a* may be wholly or partially integrated with the Wi-Fi modem of the AP 102-*a*, for example, by using common hardware implementing medium access control (MAC) or shared power amplifiers (PAS).

In some implementations, upon detection of an outage, the AP 102-*a* may re-route traffic from the cable/fiber modem 215 to another connected client (such as the cellular-enabled device 210-*a*) via the WLAN client 220-*a* (also referred to herein as a radio). Additionally, or alternatively, upon detection of an outage, the AP 102-*a* may instruct a client (such as the client device 230-*a*) to directly hotspot to a selected alternative connected client (such as the cellular-enabled device 210-*a*) based on one or more traffic streams associated with the client device 230-*a*. The AP 102-*a* may instruct the client to directly hotspot to one of the candidate cellular-enabled devices 210 when delay is to be minimized or when the client is engaged in P2P communications, which may be difficult to support via a seamless relay through the AP 102-*a*. In some implementations, the AP 102-*a* may send a notification to a voluntary cellular-enabled device (such as the cellular-enabled device 210-*b*) to indicate when the device is being used as a hotspot, and when the hotspot usage has completed. The notification may prompt the device owner to keep the device fully charged, and to consider stopping some traffic streams (such as watching personal videos). The notification may include connection details, such as which client device(s) are using the cellular-enabled device to access the communication network 205.

In some implementations, the AP 102-*a* may provide the client with a list of candidate cellular-enabled devices 210 such that the client can independently select one of the candidate cellular-enabled devices 210. Accordingly, the selected cellular-enabled device 210 may relay traffic to the communication network 205. When the outage condition ceases, the AP 102-*a* may communicate with the client device 230-*a* and direct the client device 230-*a* to re-connect to the communication network 205 through the AP 102-*a*. In some implementations, one or both of the AP 102-*a* or the client may use path selection algorithms to reconfigure the network in view of the new backhaul selection. This process may include changing device attachments (such as for a cellular-enabled device 210 or another AP 102) and traffic routing, taking into account factors such as device location, latency constraints, and throughput constraints.

Figures 3A, 3B, 3C:
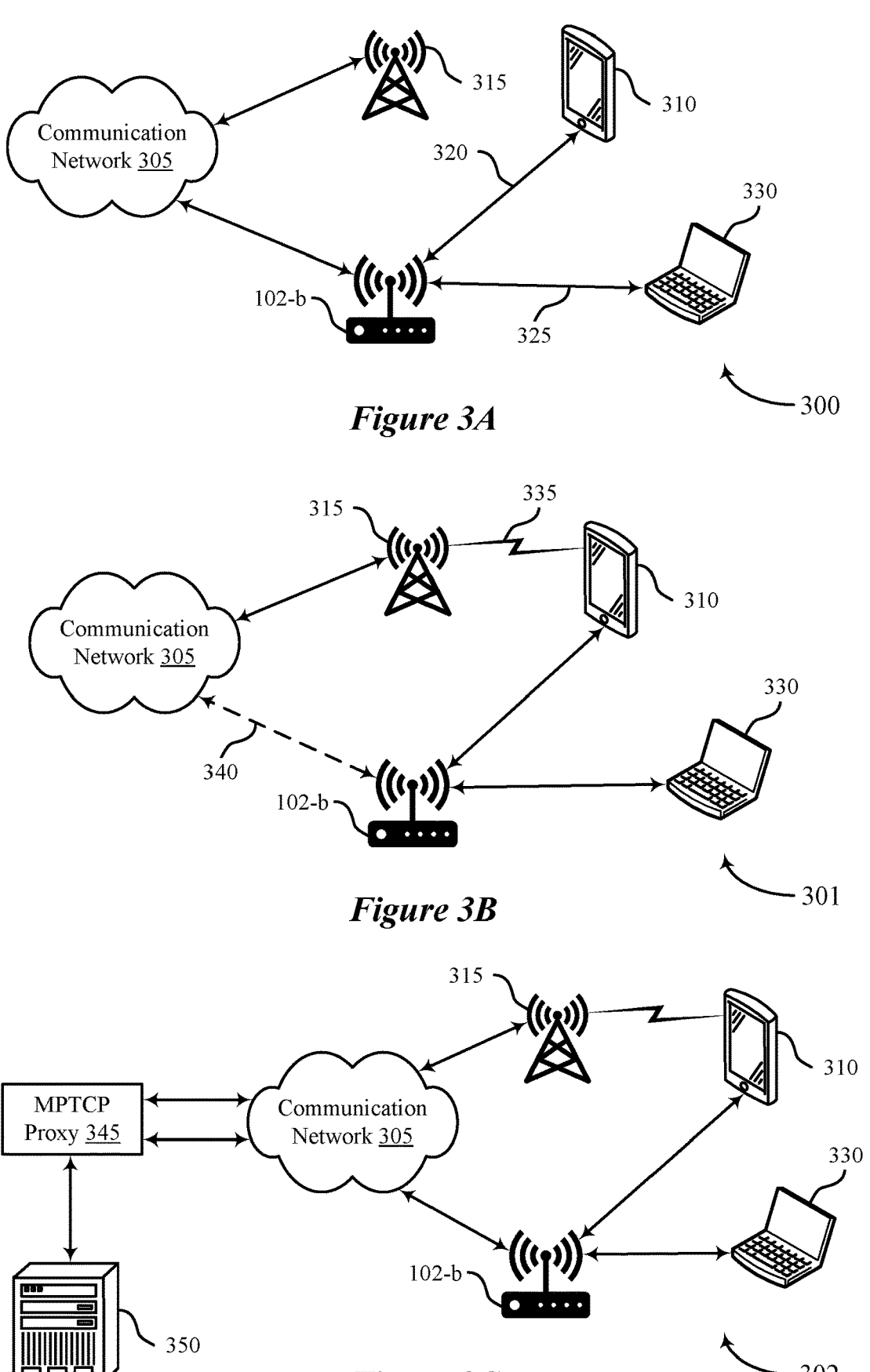
FIGS. 3A, 3B and 3C show example network diagrams that support dynamic path selection techniques for wireless connectivity.

FIGS. 3A, 3B and 3C show example network diagrams 300, 301, and 302, respectively, that support dynamic path selection techniques for wireless connectivity. The network diagrams 300, 301, and 302 may implement or be implemented by aspects of the WLAN 100 or the signaling diagram 200. For example, the network diagram 300 includes a communication network 305, which may be an example of the communication network 205 described herein, including with reference to FIG. 2. The network diagram 301 includes a cellular-enabled device 310 and a client device 330, which may be examples of wireless STAs described herein, such as the STAs 104 described with reference to FIG. 1. The network diagram 301 includes an AP 102-*b*, which may be an example of a wireless AP described herein, such as the AP 102 described with reference to FIG. 1. In some implementations, the AP 102-*b* may include one or multiple customer premise equipments (CPEs).

In accordance with some innovative aspects of the subject matter described in this disclosure, an AP 102-*b* (such as a home AP) may provide the client device 330 with multiple paths to the communication network 305 (such as the Internet), offering enhanced availability and access. Some of these paths (such as a cable connection) may be preset, while others may be dynamically discovered as they become available (such as when a user returns home with the cellular-enabled device 310). The path selection process of the AP 102-*a* may be according to quality metrics (such as throughput or latency), charging status (such as whether a device is connected to power or battery), processor use information, or data plan type (such as unlimited, capped, or charged per byte), among other examples.

Alternative routes to the communication network 305 can be used to overcome backhaul failures, to enhance network availability and access, or both. In some implementations, a computing application running on the AP 102-*a* can act as an MPTCP proxy for devices that support Wi-Fi (such as the client device 330), thereby opportunistically enhancing the performance of these devices. MPTCP can be used to improve the responsiveness of the client device 330, for example, by providing the client device 330 with multiple paths to the communication network 305.

In accordance with the techniques described herein, the AP 102-*b* may choose between at least two paths to the communication network 305. The at least two paths may include a default path, such as a backhaul connection between the AP 102-*b* and the communication network 305, and an alternative path, such as a cellular connection 335 between the communication network 305 and the cellular-enabled device 310. However, it is to be understood that the techniques described herein are also applicable to other path types (such as via satellite connections, sidelink connections or fixed wireless paths, etc.).

In some implementations, the AP 102-*b* may select the cellular-enabled device 310 to relay wireless communications between the client device 330 (which may be distinct from the cellular-enabled device 310) and the communication network 305 according to resource discovery information, communication link information, and device status information provided by the cellular-enabled device 310. The communication link information may indicate path metrics associated with the cellular connection 335 between the communication network 305 and the cellular-enabled device 310, path metrics associated with a wireless communication link 320 between the AP 102-*b* and the cellular-enabled device 310, or both. In some implementations, the AP 102-*b* also may dynamically discover and update the status of the backhaul connection 340 between the AP 102-*b* and the communication network 305. The AP 102-*b* use this status information to determine whether to continue using the backhaul connection 340 or switch to an alternative path.

In some implementations, the AP 102-*b* may select the cellular-enabled device 310 to relay wireless communications between the client device 330 and the communication network 305 if a backhaul failure is detected (such as if the backhaul connection 340 is disrupted, as shown in the example of FIG. 3B). The backhaul failure may be a total failure (such as a connectivity-related failure) or a performance failure (such as a failure related to the security, reliability, bandwidth, or latency of the backhaul connection 340). In some other implementations, the AP 102-*b* may select the cellular-enabled device 310 if conditions associated with the backhaul connection 340 become unfavorable. For example, if the backhaul connection has a large available bandwidth but a low data rate due to loading (such as for cellular backhaul links), the AP 102-*b* may switch to using the cellular connection 335 to access the communication network 305 via the cellular-enabled device 310 and a radio access network entity 315. In some implementations, the AP 102-*b* may relay traffic from the client device 330 to the communication network 305 via the cellular-enabled device 310. In some other implementations, the AP 102-*b* may direct the client device 330 to hotspot directly to the cellular-enabled device 310 such that the cellular-enabled device 310 can serve as a relay, thereby decreasing the number of communication steps (referred to as hops) between the client device 330 and the communication network 305, and reducing the overall latency of communications between the client device 330 and the communication network 305.

The AP 102-*b* may select the cellular connection 335 between the cellular-enabled device 310 and the communication network 305 according to information about the cellular connection 335 (such as a bandwidth or frequency band associated with the cellular connection 335), a state of the cellular-enabled device 310, an availability of hotspot credentials at the AP 102-*b*, or some combination thereof. In some implementations, if the cellular connection 335 is disabled or turned off (such as when a vehicle with cellular capabilities is parked in a garage), the AP 102-*b* may transmit an activation command to turn on the cellular connection 335 such that the cellular-enabled device 310 can provide requested path metrics to the AP 102-*b*. Thereafter, the AP 102-*b* may transmit a deactivation command to switch the cellular connection 335 back off. The AP 102-*b* may perform this process periodically, and may re-activate the cellular connection 335 after selecting the cellular-enabled device 310 (if the cellular connection 335 is not already active).

The AP 102-*b* may steer traffic by device or by service. In some implementations, traffic steering can be according to a user-configured prioritization of devices. The cellular-enabled device 310 may be selected according to characteristics associated with the cellular-enabled device 310, such as a data plan associated with the cellular-enabled device 310, whether the cellular-enabled device 310 is connected to power, a battery level of the cellular-enabled device 310, KPIs associated with one or both of the cellular connection 335 or the wireless communication link 320, hotspot capabilities of the cellular-enabled device 310, predicted availability of the cellular-enabled device 310 (such as a mobility of the cellular-enabled device 310), or calendar information extracted from the cellular-enabled device 310, among other examples.

In the event that a default path to the communication network 305 (such as the backhaul connection 340) becomes inoperative, the AP 102-*b* may select an alternative cellular path (such as the cellular connection 335) and which traffic streams to steer between the communication network 305 and the client device 330 via the alternative cellular path. The selection process may be a function of the capability or status of the alternative path (such as path metrics associated with the alternative path). In some implementations, the AP 102-*b* may establish an MPTCP connection with an MPTCP proxy 345 (such as an MPTCP-capable endpoint of the communication network 305) that is connected to a core network entity 350. The MPTCP connection may utilize both the backhaul connection 340 and the cellular connection 335. As described herein, MPTCP is a form of inverse multiplexing, whereby one stream is split into many.

The AP 102-*b* may select the alternate cellular path (such as the cellular connection 335) over a current path (such as the backhaul connection 340) if, for example, a KPI of the current path (such as link quality) falls below a first threshold and a corresponding KPI of the alternate path is above a second threshold. Additionally, or alternatively, the AP 102-*b* may select an alternate path if a KPI of the current path is below a corresponding KPI of the alternate path by more than a threshold. In some implementations, the AP 102-*b* may re-activate the current/default path if a KPI of the current path satisfies a threshold.

In some implementations, two or more device streams may be multiplexed into a single stream before being routed to the cellular connection 335. The cellular connection 335 may, in some implementations, have a lower overall bandwidth than an operative wired connection (such as the backhaul connection 340), so multiplexing, compressing, or otherwise filtering the stream may be desirable in some deployments. Thus, in some implementations, the AP 102-*b* may combine multiple device streams into one (such as when the streams have the same destination).

After selecting the cellular-enabled device 310, the AP 102-*b* may attach to the cellular-enabled device 310 and steer data from the client device 330 to the cellular-enabled device 310 such that the cellular-enabled device 310 can relay the data to the communication network 305 via the cellular connection 335. In some implementations, the cellular-enabled device 310 may be unable to distinguish whether the incoming data is from the AP 102-*b* or the client device 330 (from which the data originated). The cellular-enabled device 310 may discontinue being a client of the AP 102-*b* or continue being a client of the AP 102-*b* if, for example, the cellular-enabled device 310 has a second channel to use as a hotspot while maintaining a wireless communication link 320 to the AP 102-*b*.

In some implementations, the wireless communication link 320 between the AP 102-*b* and the cellular-enabled device 310 may be associated with a first SSID (such as HotSpot_SSID, Channel 2), and a wireless communication link 325 between the AP 102-*b* and the client device 330 may be associated with a second SSID (such as AP_SSID, Channel 1). Before the cellular connection 335 is established or activated (as shown in the example of FIG. 3A), both the cellular-enabled device 310 and the client device 330 may connect to the AP 102-*b* using the first SSID. In such implementations, traffic may be routed to the communication network 305 via the backhaul connection 340 (such as a landline). After the cellular connection 335 is established and the cellular-enabled device 310 is chosen to relay wireless communications between the client device 330 and the communication network 305, a hotspot may be activated on the cellular-enabled device 310 using the second SSID, which the AP client and one or more of the current clients connected to the AP client may use to connect to the cellular-enabled device 310. Accordingly, traffic may be routed through the cellular-enabled device 310 using the cellular connection 335.

Figure 4:
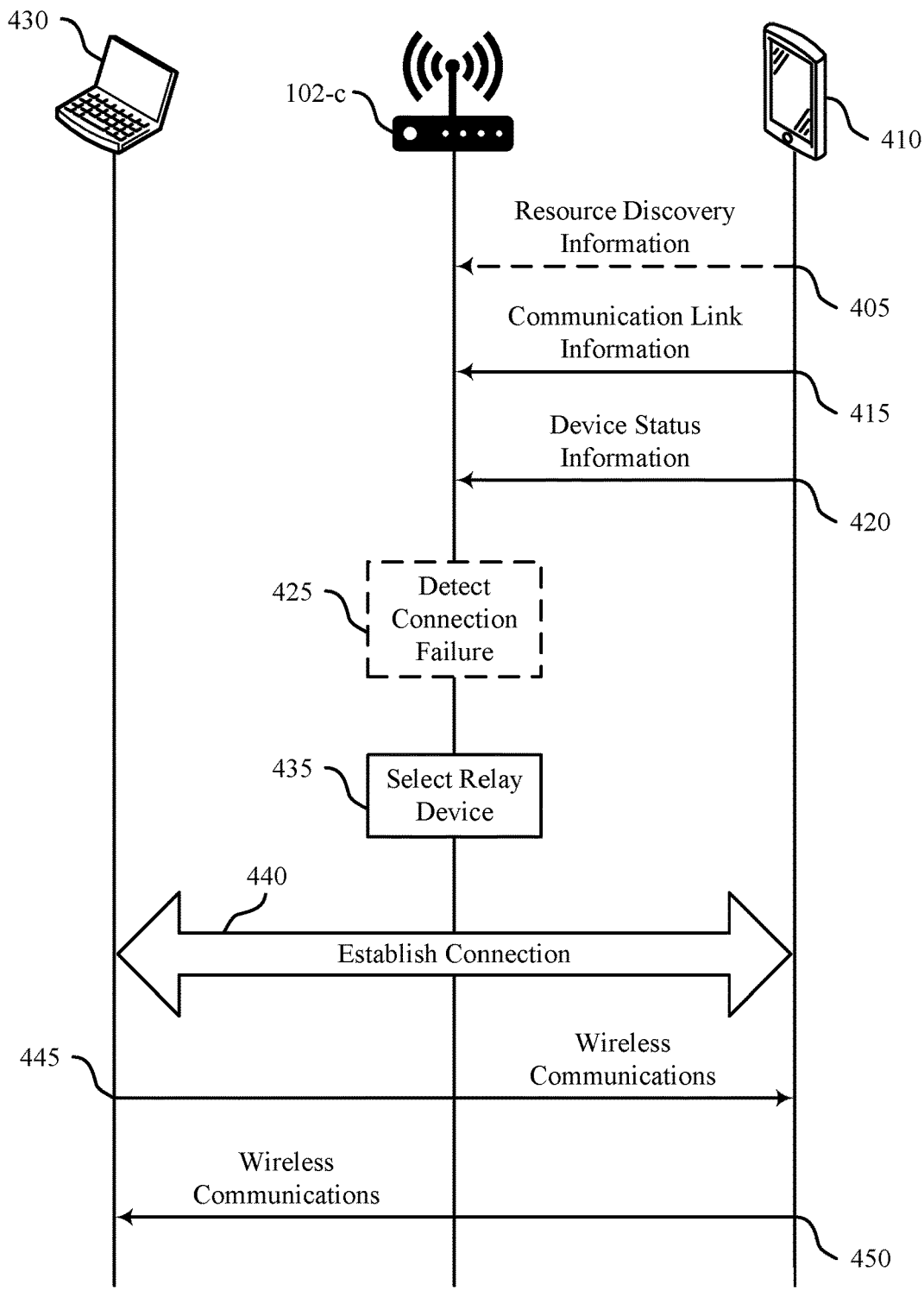
FIG. 4 shows an example process flow that supports dynamic path selection techniques for wireless connectivity.

FIG. 4 shows an example process flow 400 that supports dynamic path selection techniques for wireless connectivity. The process flow 400 may implement or be implemented by one or more aspects of the WLAN 100, the signaling diagram 200, the network diagram 300, the network diagram 301, or the network diagram 302. For example, the process flow 400 includes an AP 102-*c*, which may be an example of one or more aspects of a wireless AP described herein, such as the AP 102-*a* described with reference to FIG. 2. The process flow 400 also includes a cellular-enabled device 410 and a client device 430, which may be examples of wireless STAs (or components thereof), such as the STAs 104 described with reference to FIG. 1. In the following description of the process flow 400, operations between the client device 430, the AP 102-*c*, and the cellular-enabled device 410 may be added, omitted, or performed in a different order (with respect to the order shown).

At 405, the AP 102-*c* may receive resource discovery information from one or more cellular-enabled devices (such as phones, laptops with cellular modems, or hotspots), including the cellular-enabled device 410. The resource discovery information may indicate, for example, an identifier of the cellular-enabled device 410, a radio access technology (RAT) associated with the cellular-enabled device 410, or a cellular network associated with the cellular-enabled device 410, among other examples. In some implementations, the automatic cellular modem discovery behavior of the AP 102-*c* can be preset.

At 415, the AP 102-*c* may receive communication link information from the one or more cellular-enabled devices, including the cellular-enabled device 410. The communication link information may indicate path metrics associated with respective connections between the one or more cellular-enabled devices and a communication network (such as the Internet). For example, the communication link information may indicate quality metrics associated with the respective connections, radio access types of the respective connections, respective connection strengths between the communication network and the one or more cellular-enabled devices, or a combination thereof. Additionally, or alternatively, the path metrics may indicate one or more of a link quality between the AP 102-*c* and the cellular-enabled device 410, a link type (such as NR or LTE), or link quality between the cellular-enabled device 410 and the communication network.

At 420, the AP 102-*c* may receive device status information from the one or more cellular-enabled devices, including the cellular-enabled device 410. The device status information may indicate operational metrics associated with each of the one or more cellular-enabled devices, such as charging status information (such as whether the cellular-enabled device 410 is connected to power or running on battery), power source information, battery level information, cellular subscription information (such as whether a cellular data plan of the cellular-enabled device 410 is unlimited, capped, or charged per byte), device calendar information, processor workload information, security policy information, predictive device availability, device mobility information, or a combination thereof.

In some implementations, at 425, the AP 102-*c* may receive an indication of a failure associated with a default connection (such as a backhaul connection) between the AP 102-*c* and the communication network. The failure may include a connectivity failure of the default connection between the AP and the communication network, a performance failure of the default connection, or both. As described herein, a performance failure may pertain to the security of the default connection, a reliability of the default connection, a throughput of the default connection, a latency of the default connection, or a combination thereof.

At 435, the AP 102-*c* may select the cellular-enabled device 410 to relay wireless communications between the communication network and the client device 430 (such as a wireless communication device without cellular capabilities) in accordance with the communication link information, the device status information, and path metrics associated with the default connection between the AP 102-*c* and the communication network. If, for example, the AP 102-*c* is unable to locate or otherwise identify any cellular-capable devices running a distributed computing application, the AP 102-*c* may connect to a device that supports cellular hotspots (such as the cellular-enabled device 410). In some implementations, the AP 102-*c* may select multiple cellular-enabled devices to relay the wireless communications.

At 440, the AP 102-*c* may establish a connection with the client device 430 and the cellular-enabled device 410, thereby enabling the AP 102-*c* to steer traffic from the client device 430 to the communication network via a cellular connection between the cellular-enabled device 410 and the communication device. For example, at 445, the AP 102-*c* may steer wireless communications (also referred to as traffic) from the client device 430 to the cellular-enabled device 410 such that the cellular-enabled device 410 can relay the wireless communications to the communication network. Likewise, at 450, the cellular-enabled device 410 may relay wireless communications from the communication network to the AP 102-*c* such that the AP 102-*c* can steer the wireless communications back to the client device 430. In some implementations, the AP 102-*c* may direct the client device 430 to hotspot directly to the cellular-enabled device 410.

As described with reference to FIG. 3C, the AP 102-*c* may, in some implementations, establish a proxy MPTCP connection on behalf of the client device 430 (which may have a singular Wi-Fi modem) to provide greater connection reliability. The MPTCP connection established by the AP 102-*c* may involve multiple devices, such as the cellular-enabled device 410 and other cellular-capable devices in the vicinity of the AP 102-*c*. The AP 102-*c* can use one or more physical/logical Wi-Fi modems (such as the WLAN clients 220 described with reference to FIG. 2) to access devices that offer hotspot capabilities.

In some implementations, the traffic steering behavior of the AP 102-*c* can be configured by a user or administrator of the network. Additionally, or alternatively, the traffic steering behavior of the AP 102-*c* can be according to a user-configured prioritization of devices, traffic flows, or both. For example, the AP 102-*c* may selectively steer traffic flows such that traffic associated with a first application is steered but traffic associated with a second application is not steered. In some implementations, the AP 102-*c* may steer traffic according to various traffic KPIs such as end-to-end throughput, latency, or jitter. The traffic steering mechanisms disclosed herein may enable the AP 102-*c* to leverage cellular modems connected to a mmW network for high-bandwidth applications. In some implementations, the traffic steering behavior of the AP 102-*c* may depend on the OS of the cellular-enabled device 410 and whether the cellular-enabled device 410 is configured to run a specific computing application.

The AP 102-*c* may include a WLAN modem, a cellular modem, or both. If the AP 102-*c* is powered via ethernet, the cellular modem of the AP 102-*c* may not function correctly if the ethernet connection is disrupted. The techniques and operations described in this disclosure, including those with reference to FIG. 4, may enable the AP 102-*c* to opportunistically use other devices with a cellular modem and hotspot capabilities (such as the cellular-enabled device 410). In some implementations, the cellular-enabled device 410 may be battery-operated. Using the cellular-enabled device 410 to relay communications between the client device 430 and the communication network may enable the AP 102-*c* to provide Internet access to the client device 430 without an extra SIM subscription.

FIG. 5 shows a flowchart illustrating an example process 500 performable by a wireless communication device that supports dynamic path selection techniques for wireless connectivity. The operations of the process 500 may be implemented by a wireless AP or components thereof. For example, the process 500 may be performed by a wireless communication device, such as the wireless communication device 800 described with reference to FIG. 8, operating as or within a wireless AP. In some implementations, the process 500 may be performed by a wireless AP, such as the AP 102 described with reference to FIG. 1.

At 505, the AP may receive communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices.

At 510, the AP may select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

FIG. 6 shows a flowchart illustrating an example process 600 performable by a wireless communication device that supports dynamic path selection techniques for wireless connectivity. The operations of the process 600 may be implemented by a wireless AP or components thereof. For example, the process 600 may be performed by a wireless communication device, such as the wireless communication device 800 described with reference to FIG. 8, operating as or within a wireless AP. In some implementations, the process 600 may be performed by a wireless AP, such as the AP 102 described with reference to FIG. 1.

At 605, the AP may receive communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices.

At 610, the AP may receive an indication associated with a failure of a default connection between the AP and the communication network, where the default connection includes a backhaul connection.

At 615, the AP may select at least one cellular-enabled device of the one or more cellular-enabled devices to use for relaying wireless communications between the communication network and one or more client devices associated with the AP in accordance with the indication, the communication link information, the device status information, and path metrics associated with the default connection between the AP and the communication network.

FIG. 7 shows a flowchart illustrating an example process 700 performable by a wireless communication device that supports dynamic path selection techniques for wireless connectivity. The operations of the process 700 may be implemented by a wireless STA or components thereof. For example, the process 700 may be performed by a wireless communication device, such as the wireless communication device 900 described with reference to FIG. 9, operating as or within a wireless STA. In some implementations, the process 700 may be performed by a wireless STA, such as one of the STAs 104 described with reference to FIG. 1.

At 705, a cellular-enabled device (such as a STA) may transmit device status information and communication link information to an AP associated with the cellular-enabled device, the communication link information including path metrics associated with a connection between the cellular-enabled device and a communication network, the device status information including operational metrics associated with the cellular-enabled device.

At 710, the cellular-enabled device may relay wireless communications between the communication network and the AP via the connection between the cellular-enabled device and the communication network.

Figure 8:
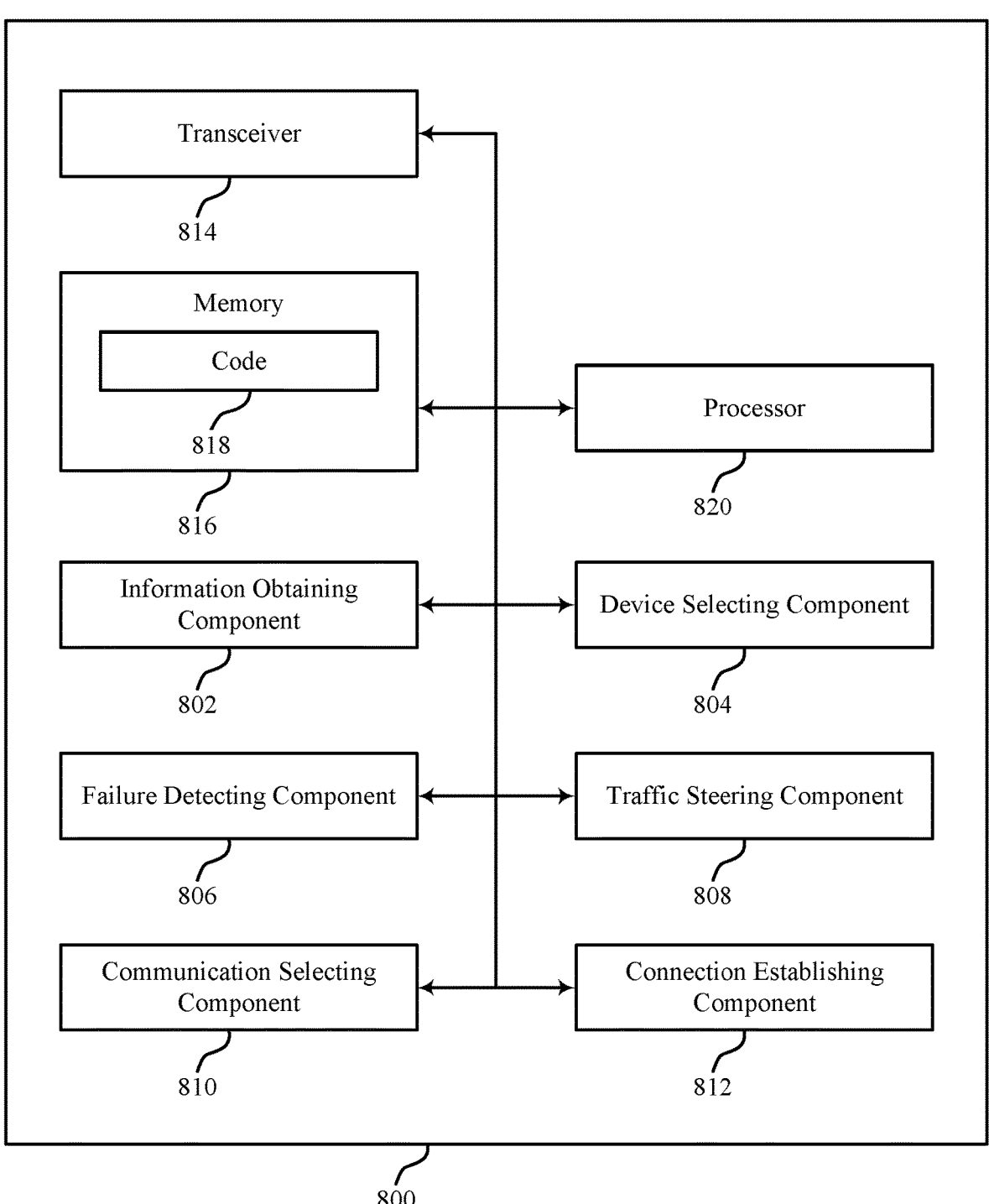
FIGS. 8 and 9 show block diagrams of example wireless communication devices that support dynamic path selection techniques for wireless connectivity.

FIG. 8 shows a block diagram of an example wireless communication device 800 that supports dynamic path selection techniques for wireless connectivity. In some implementations, the wireless communication device 800 is configured or operable to perform the process 500 described with reference to FIG. 5, the process 600 described with reference to FIG. 6, or both. In various examples, the wireless communication device 800 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor 820"); one or more radios (collectively "the radio"); and one or more memories or memory blocks (collectively "the memory 816").

In some implementations, the wireless communication device 800 can be a device for use in an AP, such as the AP 102 described with reference to FIG. 1. In some other examples, the wireless communication device 800 can be an AP that includes such a chip, SoC, chipset, package or device as well as multiple antennas. The wireless communication device 800 includes a transceiver 814 that is capable of transmitting and receiving wireless communications in the form of, for example, wireless packets. For example, the wireless communication device 800 can be configured or operable to transmit and receive packets in the form of physical layer PPDUs and MPDUs conforming to one or more of the IEEE 802.11 family of wireless communication protocol standards. In some implementations, the wireless communication device 800 also includes or can be coupled with an application processor 820 which may be further coupled with another memory 816. In some implementations, the wireless communication device 800 further includes at least one external network interface that enables communication with a core network or backhaul network to gain access to external networks including the Internet.

The wireless communication device 800 includes an information obtaining component 802, a device selecting component 804, a failure detecting component 806, a traffic steering component 808, a communication selecting component 810, and a connection establishing component 812. Portions of one or more of the components 802, 804, 806, 808, 810 and 812 may be implemented at least in part in hardware or firmware. For example, the device selecting component 804 may be implemented at least in part by a modem. In some implementations, at least some of the components 802, 804, 806, 808, 810 and 812 are implemented at least in part by a processor 820 and as software stored in a memory 816. For example, portions of one or more of the components 802, 804, 806, 808, 810 or 812 can be implemented as non-transitory instructions (or "code 818") executable by the processor to perform the functions or operations of the respective module.

In some implementations, the processor 820 may be a component of a processing system. A processing system may generally refer to a system or series of machines or components that receives inputs and processes the inputs to produce a set of outputs (which may be passed to other systems or components of, for example, the wireless communication device 800). For example, a processing system of the wireless communication device 800 may refer to a system including the various other components or sub-components of the wireless communication device 800, such as the processor 820, or a transceiver 814, or a communications manager, or other components or combinations of components of the wireless communication device 800. The processing system of the wireless communication device 800 may interface with other components of the wireless communication device 800, and may process information received from other components (such as inputs or signals) or output information to other components. For example, a chip or modem of the wireless communication device 800 may include a processing system, a first interface to output information and a second interface to obtain information. In some implementations, the first interface may refer to an interface between the processing system of the chip or modem and a transmitter, such that the wireless communication device 800 may transmit information output from the chip or modem. In some implementations, the second interface may refer to an interface between the processing system of the chip or modem and a receiver, such that the wireless communication device 800 may obtain information or signal inputs, and the information may be passed to the processing system. A person having ordinary skill in the art will readily recognize that the first interface also may obtain information or signal inputs, and the second interface also may output information or signal outputs.

The information obtaining component 802 may be capable of, configured to, or operable to obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices.

The device selecting component 804 may be capable of, configured to, or operable to select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

In some implementations, the failure detecting component 806 may be capable of, configured to, or operable to receive an indication associated with a failure of the default connection between the AP and the communication network, where at least one cellular-enabled device is selected in accordance with the indication, and where the default connection includes a backhaul connection.

In some implementations, the failure includes a connectivity failure of the backhaul connection between the AP and the communication network, a performance failure of the backhaul connection, or both. In some implementations, the performance failure corresponds to a security of the backhaul connection, a reliability of the backhaul connection, a throughput of the backhaul connection, a latency of the backhaul connection, or a combination thereof.

In some implementations, the traffic steering component 808 may be capable of, configured to, or operable to steer the wireless communications according to a respective priority of each of the one or more cellular-enabled devices, a respective priority of each of the one or more client devices, a respective priority of each service running on the one or more client devices, or a combination thereof.

In some implementations, the communication selecting component 810 may be capable of, configured to, or operable to select a subset of the wireless communications to relay between the communication network and the one or more client devices according to respective priorities of services associated with the subset of the wireless communications, path metrics associated with a cellular connection between the communication network and the at least one cellular-enabled device, or both.

In some implementations, the information obtaining component 802 may be capable of, configured to, or operable to obtain resource discovery information from each of the one or more cellular-enabled devices, where the at least one cellular-enabled device is selected according to the resource discovery information.

In some implementations, the path metrics associated with the respective connections between the one or more cellular-enabled devices and the communication network include quality metrics associated with the respective connections, radio access types of the respective connections, respective connection strengths between the communication network and the one or more cellular-enabled devices, or a combination thereof. In some implementations, the path metrics associated with the default connection between the AP and the communication network include throughput metrics, latency metrics, jitter metrics, or a combination thereof.

In some implementations, the operational metrics associated with each of the one or more cellular-enabled devices include a charging status information, power source information, battery level information, cellular subscription information, device calendar information, processor workload information, security policy information, predictive device availability, device mobility information, or a combination thereof.

In some implementations, the at least one cellular-enabled device is selected according to an availability of hotspot credentials at the AP if none of the one or more cellular-enabled devices are capable of running an application that supports dynamic resource discovery.

In some implementations, multiple cellular-enabled devices are selected to relay the wireless communications between the one or more client devices and the communication network. In some implementations, the at least one cellular-enabled device is selected according to a bandwidth of a cellular connection between the at least one cellular-enabled device and the communication network, an RF spectrum band associated with the cellular connection, or both.

In some implementations, the connection establishing component 812 may be capable of, configured to, or operable to establish an MPTCP connection between the AP and an MPTCP-capable endpoint of the communication network using a backhaul connection between the AP and the communication network and at least one connection between the communication network and the at least one cellular-enabled device.

In some implementations, the traffic steering component 808 may be capable of, configured to, or operable to relay the wireless communications between the one or more client devices and the communication network via the MPTCP connection.

In some implementations, the one or more client devices include non-cellular-enabled devices associated with a WLAN. In some implementations, the at least one cellular-enabled device is selected according to an OS of the at least one cellular-enabled device and whether the at least one cellular-enabled device is capable of running an application that supports dynamic resource discovery.

In some implementations, the traffic steering component 808 may be capable of, configured to, or operable to steer the wireless communications to the at least one cellular-enabled device via one or more physical or logical components of the AP that support WLAN communications.

In some implementations, the traffic steering component 808 may be capable of, configured to, or operable to relay a first portion of the wireless communications via a WLAN connection between the AP and the at least one cellular-enabled device.

In some implementations, the traffic steering component 808 may be capable of, configured to, or operable to relaying a second portion of the wireless communications via a backhaul connection between the AP and the communication network.

In some implementations, the at least one cellular-enabled device is selected if a path metric associated with at least one connection between the at least one cellular-enabled device and the communication network surpasses a path metric associated with the default connection between the AP and the communication network.

In some implementations, the at least one cellular-enabled device is selected if a path metric associated with the default connection between the AP and the communication network is below a first threshold and a corresponding path metric associated with at least one connection between the at least one cellular-enabled device and the communication network is above a second threshold.

In some implementations, the at least one cellular-enabled device is selected if a difference between a path metric associated with the default connection between the AP and the communication network and a corresponding path metric associated with at least one connection between the at least one cellular-enabled device and the communication network satisfies a threshold.

In some implementations, communications using the default connection between the AP and the communication network are resumed if a path metric associated with the default connection satisfies a threshold.

In some implementations, the connection establishing component 812 may be capable of, configured to, or operable to establish a connection with the one or more client devices using an AP SSID. In some implementations, the connection establishing component 812 may be capable of, configured to, or operable to establish a connection with the at least one cellular-enabled device using a hotspot SSID.

In some implementations, the traffic steering component 808 may be capable of, configured to, or operable to relay the wireless communications between the one or more client devices and the communication network via a cellular connection, a fixed wireless connection, or a satellite connection between the at least one cellular-enabled device and the communication network, where the default connection between the AP and the communication network includes a backhaul connection.

In some implementations, the one or more cellular-enabled devices are different from the one or more client devices. In some implementations, two or more device streams associated with a same destination identifier are compressed, filtered, or multiplexed into a single stream before being routed to a cellular connection between the at least one cellular-enabled device and the communication network.

In some implementations, the connection establishing component 812 may be capable of, configured to, or operable to output a first command to activate a cellular connection between the communication network and the at least one cellular-enabled device, where the cellular connection is in an inactive state.

In some implementations, the connection establishing component 812 may be capable of, configured to, or operable to output a second command to deactivate the cellular connection after receiving the communication link information and the device status information from the at least one cellular-enabled device.

In some implementations, the traffic steering component 808 may be capable of, configured to, or operable to relay traffic from the one or more client devices to the at least one cellular-enabled device for the purpose of the at least one cellular-enabled device relaying the traffic to the communication network.

In some implementations, the traffic steering component 808 may be capable of, configured to, or operable to output an instruction for the one or more client devices to communicate directly with the at least one cellular-enabled device for the purpose of the at least one cellular-enabled device relaying traffic from the one or more client devices to the communication network.

Figure 9:
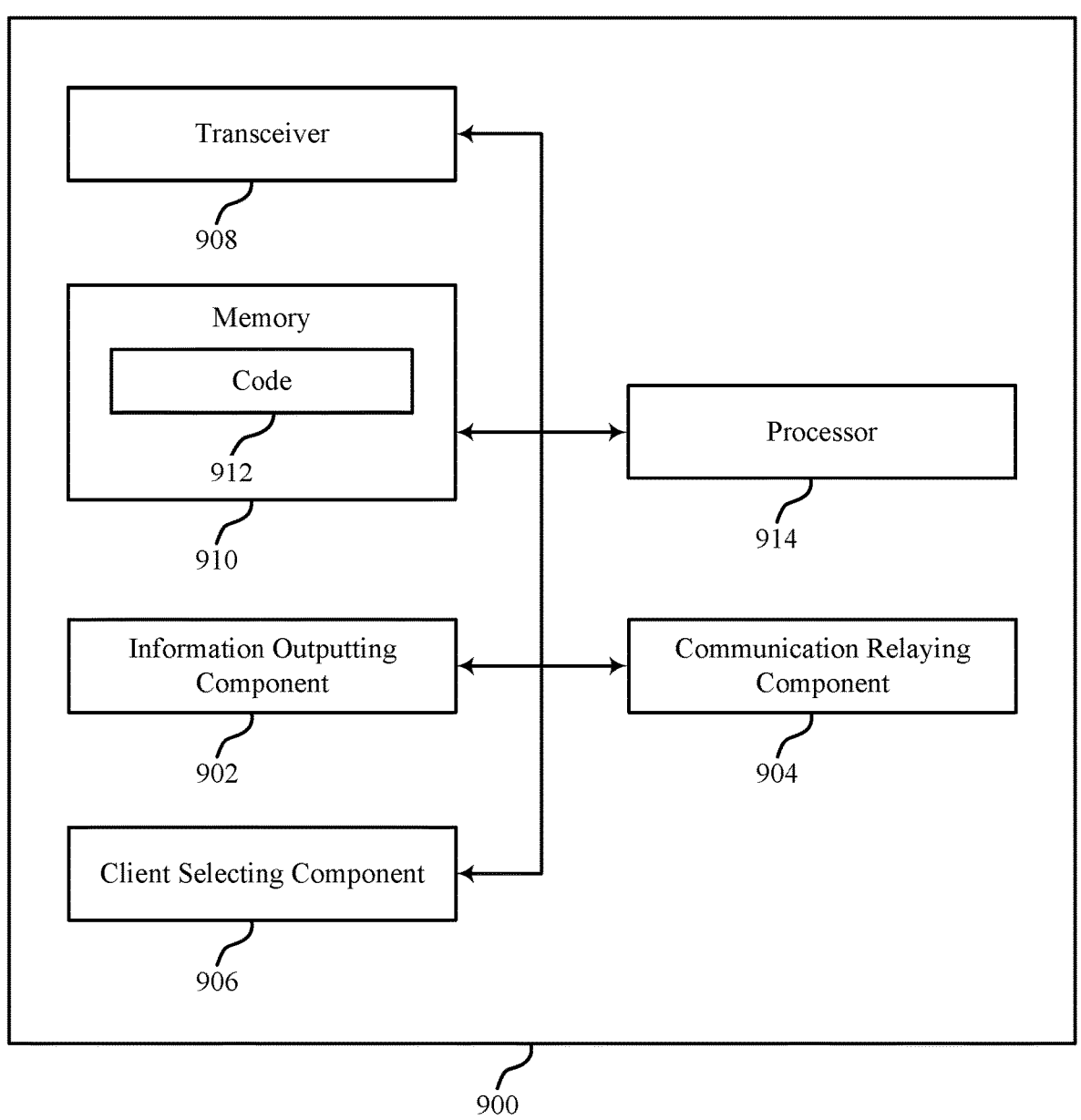

FIG. 9 shows a block diagram of an example wireless communication device 800 that supports dynamic path selection techniques for wireless connectivity. In some implementations, the wireless communication device 900 is configured or operable to perform the process 700 described with reference to FIG. 7. In various examples, the wireless communication device 900 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor 914"); one or more radios (collectively "the radio"); and one or more memories or memory blocks (collectively "the memory 910").

In some implementations, the wireless communication device 900 can be a device for use in a STA, such as one of the STAs 104 described with reference to FIG. 1. In some other examples, the wireless communication device 900 can be a STA that includes such a chip, SoC, chipset, package or device as well as multiple antennas. The wireless communication device 900 includes a transceiver 908 that is capable of transmitting and receiving wireless communications in the form of, for example, wireless packets. For example, the wireless communication device 900 can be configured or operable to transmit and receive packets in the form of physical layer PPDUs and MPDUs conforming to one or more of the IEEE 802.11 family of wireless communication protocol standards. In some implementations, the wireless communication device 900 also includes or can be coupled with an application processor 914 which may be further coupled with another memory 910. In some implementations, the wireless communication device 900 further includes a user interface (such as a touchscreen or keypad) and a display, which may be integrated with the user interface to form a touchscreen display. In some implementations, the wireless communication device 900 may further include one or more sensors such as, for example, one or more inertial sensors, accelerometers, temperature sensors, pressure sensors, or altitude sensors.

The wireless communication device 900 includes an information outputting component 902, a communication relaying component 904, and a client selecting component 906. Portions of one or more of the components 902, 904, and 906 may be implemented at least in part in hardware or firmware. For example, the communication relaying component 904 may be implemented at least in part by a modem. In some implementations, at least some of the components 902, 904, and 906 are implemented at least in part by a processor 914 and as software stored in a memory 910. For example, portions of one or more of the components 902, 904, and 906 can be implemented as non-transitory instructions (or "code 912") executable by the processor 914 to perform the functions or operations of the respective module.

In some implementations, the processor 914 may be a component of a processing system. A processing system may generally refer to a system or series of machines or components that receives inputs and processes the inputs to produce a set of outputs (which may be passed to other systems or components of, for example, the wireless communication device 900). For example, a processing system of the wireless communication device 900 may refer to a system including the various other components or subcomponents of the wireless communication device 900, such as the processor 914, or a transceiver 908, or a communications manager, or other components or combinations of components of the wireless communication device 900.

The processing system of the wireless communication device 900 may interface with other components of the wireless communication device 900, and may process information received from other components (such as inputs or signals) or output information to other components. For example, a chip or modem of the wireless communication device 900 may include a processing system, a first interface to output information and a second interface to obtain information. In some implementations, the first interface may refer to an interface between the processing system of the chip or modem and a transmitter, such that the wireless communication device 900 may transmit information output from the chip or modem. In some implementations, the second interface may refer to an interface between the processing system of the chip or modem and a receiver, such that the wireless communication device 900 may obtain information or signal inputs, and the information may be passed to the processing system. A person having ordinary skill in the art will readily recognize that the first interface also may obtain information or signal inputs, and the second interface also may output information or signal outputs.

The information outputting component 902 may be capable of, configured to, or operable to output device status information and communication link information to an AP associated with the cellular-enabled device, the communication link information including path metrics associated with a connection between the cellular-enabled device and a communication network, the device status information including operational metrics associated with the cellular-enabled device.

The communication relaying component 904 may be capable of, configured to, or operable to relay wireless communications between the communication network and the AP via the connection between the cellular-enabled device and the communication network.

In some implementations, the path metrics associated with the connection between the cellular-enabled device and the communication network include quality metrics associated with the connection, a radio access type of the connection, a connection strength between the cellular-enabled device and the communication network, or a combination thereof. In some implementations, the path metrics associated with the connection between the cellular-enabled device and the communication network include throughput metrics, latency metrics, jitter metrics, or a combination thereof.

In some implementations, the operational metrics associated with the cellular-enabled device include charging status information, power source information, battery level information, cellular subscription information, device calendar information, processor workload information, security policy information, predictive device availability, device mobility information, or a combination thereof.

In some implementations, the information outputting component 902 may be capable of, configured to, or operable to output discovery information that indicates a hotspot capability of the cellular-enabled device, where relaying the wireless communications between the AP and the communication network is in accordance with the discovery information.

In some implementations, the communication relaying component 904 may be capable of, configured to, or operable to relay the wireless communications between the AP and the communication network via an MPTCP connection established by the AP.

In some implementations, the client selecting component 906 may be capable of, configured to, or operable to selectively discontinue as a client of the AP or continue as a client of the AP if the cellular-enabled device has a second channel to use as a hotspot while maintaining a communication link with the AP.

Clause 1: An apparatus for wireless communication at an AP, including: one or more interfaces configured to: obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices; and a processing system configured to: select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Clause 2: The apparatus of clause 1, where the one or more interfaces are further configured to: obtain an indication associated with a failure of the default connection between the AP and the communication network, where at least one cellular-enabled device is selected in accordance with the indication, and where the default connection includes a backhaul connection.

Clause 3: The apparatus of clause 2, where: the failure includes a connectivity failure of the backhaul connection between the AP and the communication network, a performance failure of the backhaul connection, or both; and the performance failure corresponds to a security of the backhaul connection, a reliability of the backhaul connection, a throughput of the backhaul connection, a latency of the backhaul connection, or a combination thereof.

Clause 4: The apparatus of any of clauses 1-3, where the processing system is further configured to: steer the wireless communications according to a respective priority of each of the one or more cellular-enabled devices, a respective priority of each of the one or more client devices, a respective priority of each service running on the one or more client devices, or a combination thereof.

Clause 5: The apparatus of any of clauses 1-4, where the processing system is further configured to: select a subset of the wireless communications to relay between the communication network and the one or more client devices according to respective priorities of services associated with the subset of the wireless communications, path metrics associated with a cellular connection between the communication network and the at least one cellular-enabled device, or both.

Clause 6: The apparatus of any of clauses 1-5, where the one or more interfaces are further configured to: obtain resource discovery information from each of the one or more cellular-enabled devices, where the at least one cellular-enabled device is selected according to the resource discovery information.

Clause 7: The apparatus of any of clauses 1-6, where the path metrics associated with the respective connections between the one or more cellular-enabled devices and the communication network include quality metrics associated with the respective connections, radio access types of the respective connections, respective connection strengths between the communication network and the one or more cellular-enabled devices, or a combination thereof.

Clause 8: The apparatus of any of clauses 1-7, where the operational metrics associated with each of the one or more cellular-enabled devices include a charging status information, power source information, battery level information, cellular subscription information, device calendar information, processor workload information, security policy information, predictive device availability, device mobility information, or a combination thereof.

Clause 9: The apparatus of any of clauses 1-8, where the at least one cellular-enabled device is selected according to an availability of hotspot credentials at the AP if none of the one or more cellular-enabled devices are capable of running an application that supports dynamic resource discovery.

Clause 10: The apparatus of any of clauses 1-9, where multiple cellular-enabled devices are selected to relay the wireless communications between the one or more client devices and the communication network.

Clause 11: The apparatus of any of clauses 1-10, where the path metrics associated with the default connection between the AP and the communication network include throughput metrics, latency metrics, jitter metrics, or a combination thereof.

Clause 12: The apparatus of any of clauses 1-11, where the at least one cellular-enabled device is selected according to a bandwidth of a cellular connection between the at least one cellular-enabled device and the communication network, a RF spectrum band associated with the cellular connection, or both.

Clause 13: The apparatus of any of clauses 1-12, where: the processing system is further configured to: establish a MPTCP connection between the AP and an MPTCP-capable endpoint of the communication network using a backhaul connection between the AP and the communication network and at least one connection between the communication network and the at least one cellular-enabled device; and the one or more interfaces are further configured to: relay the wireless communications between the one or more client devices and the communication network via the MPTCP connection.

Clause 14: The apparatus of any of clauses 1-13, where the one or more client devices include non-cellular-enabled devices associated with a WLAN.

Clause 15: The apparatus of any of clauses 1-14, where the at least one cellular-enabled device is selected according to an OS of the at least one cellular-enabled device and whether the at least one cellular-enabled device is capable of running an application that supports dynamic resource discovery.

Clause 16: The apparatus of any of clauses 1-15, where the processing system is further configured to: steer the wireless communications to the at least one cellular-enabled device via one or more physical or logical components of the AP that support WLAN communications.

Clause 17: The apparatus of any of clauses 1-16, where the one or more interfaces are further configured to: relay a first portion of the wireless communications via a WLAN connection between the AP and the at least one cellular-enabled device; and relay a second portion of the wireless communications via a backhaul connection between the AP and the communication network.

Clause 18: The apparatus of any of clauses 1-17, where the at least one cellular-enabled device is selected if a path metric associated with at least one connection between the at least one cellular-enabled device and the communication network surpasses a path metric associated with the default connection between the AP and the communication network.

Clause 19: The apparatus of any of clauses 1-18, where the at least one cellular-enabled device is selected if a path metric associated with the default connection between the AP and the communication network is below a first threshold and a corresponding path metric associated with at least one connection between the at least one cellular-enabled device and the communication network is above a second threshold.

Clause 20: The apparatus of any of clauses 1-19, where the at least one cellular-enabled device is selected if a difference between a path metric associated with the default connection between the AP and the communication network and a corresponding path metric associated with at least one connection between the at least one cellular-enabled device and the communication network satisfies a threshold.

Clause 21: The apparatus of any of clauses 1-20, where communications using the default connection between the AP and the communication network are resumed if a path metric associated with the default connection satisfies a threshold.

Clause 22: The apparatus of any of clauses 1-21, where the processing system is further configured to: establish a connection with the one or more client devices using an AP SSID; and establish a connection with the at least one cellular-enabled device using a hotspot SSID.

Clause 23: The apparatus of any of clauses 1-22, where the one or more interfaces are further configured to: relay the wireless communications between the one or more client devices and the communication network via a cellular connection, a fixed wireless connection, or a satellite connection between the at least one cellular-enabled device and the communication network, where the default connection between the AP and the communication network includes a backhaul connection.

Clause 24: The apparatus of any of clauses 1-23, where the one or more cellular-enabled devices are different from the one or more client devices.

Clause 25: The apparatus of any of clauses 1-24, where two or more device streams associated with a same destination identifier are compressed, filtered, or multiplexed into a single stream before being routed to a cellular connection between the at least one cellular-enabled device and the communication network.

Clause 26: The apparatus of any of clauses 1-25, where the one or more interfaces are further configured to: output a first command to activate a cellular connection between the communication network and the at least one cellular-enabled device, where the cellular connection is in an inactive state; and output a second command to deactivate the cellular connection after receiving the communication link information and the device status information from the at least one cellular-enabled device.

Clause 27: The apparatus of any of clauses 1-26, where the one or more interfaces are further configured to: relay traffic from the one or more client devices to the at least one cellular-enabled device for the purpose of the at least one cellular-enabled device relaying the traffic to the communication network.

Clause 28: The apparatus of any of clauses 1-27, where the one or more interfaces are further configured to: output an instruction for the one or more client devices to communicate directly with the at least one cellular-enabled device for the purpose of the at least one cellular-enabled device relaying traffic from the one or more client devices to the communication network.

Clause 29: An apparatus for wireless communication at a cellular-enabled device, including: one or more interfaces configured to: output device status information and communication link information to an AP associated with the cellular-enabled device, the communication link information including path metrics associated with a connection between the cellular-enabled device and a communication network, the device status information including operational metrics associated with the cellular-enabled device; and relay wireless communications between the communication network and the AP via the connection between the cellular-enabled device and the communication network.

Clause 30: The apparatus of clause 105, where the path metrics associated with the connection between the cellular-enabled device and the communication network include quality metrics associated with the connection, a radio access type of the connection, a connection strength between the cellular-enabled device and the communication network, or a combination thereof.

Clause 31: The apparatus of any of clauses 29-30, where the operational metrics associated with the cellular-enabled device include charging status information, power source information, battery level information, cellular subscription information, device calendar information, processor workload information, security policy information, predictive device availability, device mobility information, or a combination thereof.

Clause 32: The apparatus of any of clauses 29-31, where the one or more interfaces are further configured to: output discovery information that indicates a hotspot capability of the cellular-enabled device, where relaying the wireless communications between the AP and the communication network is in accordance with the discovery information.

Clause 33: The apparatus of any of clauses 29-32, where the path metrics associated with the connection between the cellular-enabled device and the communication network include throughput metrics, latency metrics, jitter metrics, or a combination thereof.

Clause 34: The apparatus of any of clauses 29-33, where the one or more interfaces are further configured to: relay the wireless communications between the AP and the communication network via a MPTCP connection established by the AP.

Clause 35: The apparatus of any of clauses 29-34, further including: a processing system configured to: selectively discontinue as a client of the AP or continuing as a client of the AP if the cellular-enabled device has a second channel to use as a hotspot while maintaining a communication link with the AP.

Clause 36: A method for wireless communication at an AP, including: receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices; and selecting at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Clause 37: The method of clause 112, further including: receiving an indication associated with a failure of the default connection between the AP and the communication network, where at least one cellular-enabled device is selected in accordance with the indication, and where the default connection includes a backhaul connection.

Clause 38: The method of clause 37, where: the failure includes a connectivity failure of the backhaul connection between the AP and the communication network, a performance failure of the backhaul connection, or both; and the performance failure corresponds to a security of the backhaul connection, a reliability of the backhaul connection, a throughput of the backhaul connection, a latency of the backhaul connection, or a combination thereof.

Clause 39: The method of any of clauses 36-38, further including: steering the wireless communications according to a respective priority of each of the one or more cellular-enabled devices, a respective priority of each of the one or more client devices, a respective priority of each service running on the one or more client devices, or a combination thereof.

Clause 40: The method of any of clauses 36-39, further including: selecting a subset of the wireless communications to relay between the communication network and the one or more client devices according to respective priorities of services associated with the subset of the wireless communications, path metrics associated with a cellular connection between the communication network and the at least one cellular-enabled device, or both.

Clause 41: The method of any of clauses 36-40, further including: receiving resource discovery information from each of the one or more cellular-enabled devices, where the at least one cellular-enabled device is selected according to the resource discovery information.

Clause 42: The method of any of clauses 36-41, where the path metrics associated with the respective connections between the one or more cellular-enabled devices and the communication network include quality metrics associated with the respective connections, radio access types of the respective connections, respective connection strengths between the communication network and the one or more cellular-enabled devices, or a combination thereof.

Clause 43: The method of any of clauses 36-42, where the operational metrics associated with each of the one or more cellular-enabled devices include a charging status information, power source information, battery level information, cellular subscription information, device calendar information, processor workload information, security policy information, predictive device availability, device mobility information, or a combination thereof.

Clause 44: The method of any of clauses 36-43, where the at least one cellular-enabled device is selected according to an availability of hotspot credentials at the AP if none of the one or more cellular-enabled devices are capable of running an application that supports dynamic resource discovery.

Clause 45: The method of any of clauses 36-44, where multiple cellular-enabled devices are selected to relay the wireless communications between the one or more client devices and the communication network.

Clause 46: The method of any of clauses 36-45, where the path metrics associated with the default connection between the AP and the communication network include throughput metrics, latency metrics, jitter metrics, or a combination thereof.

Clause 47: The method of any of clauses 36-46, where the at least one cellular-enabled device is selected according to a bandwidth of a cellular connection between the at least one cellular-enabled device and the communication network, a RF spectrum band associated with the cellular connection, or both.

Clause 48: The method of any of clauses 36-47, further including: establishing a MPTCP connection between the AP and an MPTCP-capable endpoint of the communication network using a backhaul connection between the AP and the communication network and at least one connection between the communication network and the at least one cellular-enabled device; and relaying the wireless communications between the one or more client devices and the communication network via the MPTCP connection.

Clause 49: The method of any of clauses 36-48, where the one or more client devices include non-cellular-enabled devices associated with a WLAN.

Clause 50: The method of any of clauses 36-49, where the at least one cellular-enabled device is selected according to an OS of the at least one cellular-enabled device and whether the at least one cellular-enabled device is capable of running an application that supports dynamic resource discovery.

Clause 51: The method of any of clauses 36-50, further including: steering the wireless communications to the at least one cellular-enabled device via one or more physical or logical components of the AP that support WLAN communications.

Clause 52: The method of any of clauses 36-51, further including: relaying a first portion of the wireless communications via a WLAN connection between the AP and the at least one cellular-enabled device; and relaying a second portion of the wireless communications via a backhaul connection between the AP and the communication network.

Clause 53: The method of any of clauses 36-52, where the at least one cellular-enabled device is selected if a path metric associated with at least one connection between the at least one cellular-enabled device and the communication network surpasses a path metric associated with the default connection between the AP and the communication network.

Clause 54: The method of any of clauses 36-53, where the at least one cellular-enabled device is selected if a path metric associated with the default connection between the AP and the communication network is below a first threshold and a corresponding path metric associated with at least one connection between the at least one cellular-enabled device and the communication network is above a second threshold.

Clause 55: The method of any of clauses 36-54, where the at least one cellular-enabled device is selected if a difference between a path metric associated with the default connection between the AP and the communication network and a corresponding path metric associated with at least one connection between the at least one cellular-enabled device and the communication network satisfies a threshold.

Clause 56: The method of any of clauses 36-55, where communications using the default connection between the AP and the communication network are resumed if a path metric associated with the default connection satisfies a threshold.

Clause 57: The method of any of clauses 36-56, further including: establishing a connection with the one or more client devices using an AP SSID; and establishing a connection with the at least one cellular-enabled device using a hotspot SSID.

Clause 58: The method of any of clauses 36-57, further including: relaying the wireless communications between the one or more client devices and the communication network via a cellular connection, a fixed wireless connection, or a satellite connection between the at least one cellular-enabled device and the communication network, where the default connection between the AP and the communication network includes a backhaul connection.

Clause 59: The method of any of clauses 36-58, where the one or more cellular-enabled devices are different from the one or more client devices.

Clause 60: The method of any of clauses 36-59, where two or more device streams associated with a same destination identifier are compressed, filtered, or multiplexed into a single stream before being routed to a cellular connection between the at least one cellular-enabled device and the communication network.

Clause 61: The method of any of clauses 36-60, further including: transmitting a first command to activate a cellular connection between the communication network and the at least one cellular-enabled device, where the cellular connection is in an inactive state; and transmitting a second command to deactivate the cellular connection after receiving the communication link information and the device status information from the at least one cellular-enabled device.

Clause 62: The method of any of clauses 36-61, further including: relaying traffic from the one or more client devices to the at least one cellular enabled device for the purpose of the at least one cellular enabled device relaying the traffic to the communication network.

Clause 63: The method of any of clauses 36-61, further including: transmitting an instruction for the one or more client devices to communicate directly with the at least one cellular-enabled device for the purpose of the at least one cellular-enabled device relaying traffic from the one or more client devices to the communication network.

Clause 64: A method for wireless communication at a cellular-enabled device, including: transmitting device status information and communication link information to an AP associated with the cellular-enabled device, the communication link information including path metrics associated with a connection between the cellular-enabled device and a communication network, the device status information including operational metrics associated with the cellular-enabled device; and relaying wireless communications between the communication network and the AP via the connection between the cellular-enabled device and the communication network.

Clause 65: The method of clause 138, where the path metrics associated with the connection between the cellular-enabled device and the communication network include quality metrics associated with the connection, a radio access type of the connection, a connection strength between the cellular-enabled device and the communication network, or a combination thereof.

Clause 66: The method of any of clauses 64-65, where the operational metrics associated with the cellular-enabled device include charging status information, power source information, battery level information, cellular subscription information, device calendar information, processor workload information, security policy information, predictive device availability, device mobility information, or a combination thereof.

Clause 67: The method of any of clauses 64-66, further including: transmitting discovery information that indicates a hotspot capability of the cellular-enabled device, where relaying the wireless communications between the AP and the communication network is in accordance with the discovery information.

Clause 68: The method of any of clauses 64-67, where the path metrics associated with the connection between the cellular-enabled device and the communication network include throughput metrics, latency metrics, jitter metrics, or a combination thereof.

Clause 69: The method of any of clauses 64-68, further including: relaying the wireless communications between the AP and the communication network via a MPTCP connection established by the AP.

Clause 70: The method of any of clauses 64-69, further including: selectively discontinuing as a client of the AP or continuing as a client of the AP if the cellular-enabled device has a second channel to use as a hotspot while maintaining a communication link with the AP.

Clause 71: An apparatus for wireless communication at an AP, including: means for receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices; and selecting at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Clause 72: An apparatus for wireless communication at a cellular-enabled device, including: means for transmitting device status information and communication link information to an AP associated with the cellular-enabled device, the communication link information including path metrics associated with a connection between the cellular-enabled device and a communication network, the device status information including operational metrics associated with the cellular-enabled device; and means for relaying wireless communications between the communication network and the AP via the connection between the cellular-enabled device and the communication network.

Clause 73: A non-transitory computer-readable medium storing code for wireless communication at an AP, the code including instructions executable by a processor to: obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices; and select at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network.

Clause 74: A non-transitory computer-readable medium storing code for wireless communication at a cellular-enabled device, the code including instructions executable by a processor to: output device status information and communication link information to an AP associated with the cellular-enabled device, the communication link information including path metrics associated with a connection between the cellular-enabled device and a communication network, the device status information including operational metrics associated with the cellular-enabled device; and relay wireless communications between the communication network and the AP via the connection between the cellular-enabled device and the communication network.

Clause 75: A computer program including instructions that, when executed on a processor, cause the processor to perform a method of any one of clauses 36-63.

Clause 76: A computer program including instructions that, when executed on a processor, cause the processor to perform a method of any one of clauses 64-70.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable sub-combination. As such, although features may be described above as acting in particular combinations, and even initially claimed as such, one or more features from a claimed combination can, in some implementations, be excised from the combination, and the claimed combination may be directed to a sub-combination or variation of a sub-combination.

Similarly, while operations are depicted in the drawings in a particular order, this is not to be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above are not to be understood as requiring such separation in all examples, and it is to be understood that the described program components and systems can generally be integrated together in a single software product or packaged into multiple software products.

What is claimed is:

1. An access point (AP), comprising:

a processing system that includes one or more processors and one or more memories coupled with the one or more processors, the processing system configured to cause the AP to:

obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices;

select, prior to detection of a backhaul failure or degradation event, at least one cellular-enabled device of the one or more cellular-enabled devices in accordance with the communication link information, the device status information, and path metrics associated with a default connection between the AP and the communication network; and relay, via the at least one selected cellular-enabled device and in accordance with the detection of the backhaul failure or degradation event, wireless communications between the communication network and one or more client devices associated with the AP.

2. The AP of claim 1, wherein the processing system is further configured to cause the AP to:

obtain an indication associated with a failure of the default connection between the AP and the communication network, wherein the detection of the backhaul failure or degradation event is in accordance with the indication, and wherein the default connection comprises a backhaul connection.

3. The AP of claim 2, wherein:

the failure comprises a connectivity failure of the backhaul connection between the AP and the communication network, a performance failure of the backhaul connection, or both, and the performance failure corresponds to a security of the backhaul connection, a reliability of the backhaul connection, a throughput of the backhaul connection, a latency of the backhaul connection, or a combination thereof.

4. The AP of claim 1, wherein the processing system is further configured to cause the AP to:

steer the wireless communications according to a respective priority of each of the one or more cellular-enabled devices, a respective priority of each of the one or more client devices, a respective priority of each service running on the one or more client devices, or a combination thereof.

5. The AP of claim 1, wherein the processing system is further configured to cause the AP to:

select a subset of the wireless communications to relay between the communication network and the one or more client devices according to respective priorities of services associated with the subset of the wireless communications, path metrics associated with a cellular connection between the communication network and the at least one cellular-enabled device, or both.

6. The AP of claim 1, wherein the processing system is further configured to cause the AP to:

obtain resource discovery information from each of the one or more cellular-enabled devices, wherein the at least one cellular-enabled device is selected according to the resource discovery information.

7. The AP of claim 1, wherein the path metrics associated with the respective connections between the one or more cellular-enabled devices and the communication network include quality metrics associated with the respective connections, radio access types of the respective connections, respective connection strengths between the communication network and the one or more cellular-enabled devices, or a combination thereof.

8. The AP of claim 1, wherein the operational metrics associated with each of the one or more cellular-enabled devices include a charging status information, power source information, battery level information, cellular subscription information, device calendar information, processor workload information, security policy information, predictive device availability, device mobility information, or a combination thereof.

9. The AP of claim 1, wherein the at least one cellular-enabled device is selected according to an availability of hotspot credentials at the AP if none of the one or more cellular-enabled devices are capable of running an application that supports dynamic resource discovery.

10. The AP of claim 1, wherein a plurality of cellular-enabled devices are selected to relay the wireless communications between the one or more client devices and the communication network.

11. The AP of claim 1, wherein the path metrics associated with the default connection between the AP and the communication network include throughput metrics, latency metrics, jitter metrics, or a combination thereof.

12. The AP of claim 1, wherein the at least one cellular-enabled device is selected according to a bandwidth of a cellular connection between the at least one cellular-enabled device and the communication network, a radio frequency (RF) spectrum band associated with the cellular connection, or both.

13. The AP of claim 1, wherein the processing system is further configured to cause the AP to:

establish a multi-path transmission control protocol (MPTCP) connection between the AP and an MPTCP-capable endpoint of the communication network using a backhaul connection between the AP and the communication network and at least one connection between the communication network and the at least one cellular-enabled device; and relay the wireless communications between the one or more client devices and the communication network via the MPTCP connection.

14. The AP of claim 1, wherein the one or more client devices comprise non-cellular-enabled devices associated with a wireless local area network (WLAN).

15. The AP of claim 1, wherein the processing system is further configured to cause the AP to:

steer the wireless communications to the at least one cellular-enabled device via one or more physical or logical components of the AP that support wireless local area network (WLAN) communications.

16. The AP of claim 1, wherein, to relay the wireless communications, the processing system is configured to cause the AP to:

relay a first portion of the wireless communications via a wireless local area network (WLAN) connection between the AP and the at least one cellular-enabled device; and relay a second portion of the wireless communications via a backhaul connection between the AP and the communication network.

17. The AP of claim 1, wherein the wireless communications are relayed via the at least one selected cellular-enabled device if a path metric associated with at least one connection between the at least one selected cellular-enabled device and the communication network surpasses a path metric associated with the default connection between the AP and the communication network.

18. The AP of claim 1, wherein the wireless communications are relayed via the at least one selected cellular-enabled device if a path metric associated with the default connection between the AP and the communication network is below a first threshold and a corresponding path metric associated with at least one connection between the at least one selected cellular-enabled device and the communication network is above a second threshold.

19. The AP of claim 1, wherein the wireless communications are relayed via the at least one selected cellular-enabled device if a difference between a path metric associated with the default connection between the AP and the communication network and a corresponding path metric associated with at least one connection between the at least one selected cellular-enabled device and the communication network satisfies a threshold.

20. The AP of claim 1, wherein communications using the default connection between the AP and the communication network are resumed if a path metric associated with the default connection satisfies a threshold.

21. The AP of claim 1, wherein the processing system is further configured to cause the AP to:

establish a first connection with the one or more client devices using an AP service set identifier (SSID); and establish a second connection with the at least one cellular-enabled device using a hotspot SSID.

22. The AP of claim 1, wherein, to relay the wireless communications, the processing system is configured to cause the AP to:

relay the wireless communications between the one or more client devices and the communication network via a cellular connection, a fixed wireless connection, or a satellite connection between the at least one cellular-enabled device and the communication network, wherein the default connection between the AP and the communication network includes a backhaul connection.

23. The AP of claim 1, wherein the one or more cellular-enabled devices are different from the one or more client devices.

24. The AP of claim 1, wherein two or more device streams associated with a same destination identifier are compressed, filtered, or multiplexed into a single stream before being routed to a cellular connection between the at least one cellular-enabled device and the communication network.

25. The AP of claim 1, wherein the processing system is further configured to cause the AP to:

output a first command to activate a cellular connection between the communication network and the at least one cellular-enabled device, wherein the cellular connection is in an inactive state; and output a second command to deactivate the cellular connection after receiving the communication link information and the device status information from the at least one cellular-enabled device.

26. The AP of claim 1, wherein, to relay the wireless communications, the processing system is configured to cause the AP to:

relay traffic from the one or more client devices to the at least one cellular-enabled device for the purpose of the at least one cellular-enabled device relaying the traffic to the communication network.

27. The AP of claim 1, wherein the processing system is further configured to cause the AP to:

output an instruction for the one or more client devices to communicate directly with the at least one cellular-enabled device for the purpose of the at least one cellular-enabled device relaying traffic from the one or more client devices to the communication network.

28. A method for wireless communication at an access point (AP), comprising:

receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices;

selecting, prior to detection of a backhaul failure or degradation event, at least one cellular-enabled device of the one or more cellular-enabled devices in accordance with the communication link information, the device status information, and path metrics associated with a default connection between the AP and the communication network; and relaying, via the at least one selected cellular-enabled device and in accordance with the detection of the backhaul failure or degradation event, wireless communications between the communication network and one or more client devices associated with the AP.

29. A non-transitory computer-readable medium storing code for wireless communication at an access point (AP), the code comprising instructions executable by one or more processors to:

obtain communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices;

select, prior to detection of a backhaul failure or degradation event, at least one cellular-enabled device of the one or more cellular-enabled devices to use for relaying wireless communications between the communication network and one or more client devices associated with the AP in accordance with the communication link information, the device status information, and path metrics associated with a default connection between the AP and the communication network; and relay, via the at least one selected cellular-enabled device and in accordance with the detection of the backhaul failure or degradation event, wireless communications between the communication network and one or more client devices associated with the AP.

30. An apparatus for wireless communication at an access point (AP), comprising:

means for receiving communication link information and device status information from one or more cellular-enabled devices associated with the AP, the communication link information including path metrics associated with respective connections between the one or more cellular-enabled devices and a communication network, the device status information including operational metrics associated with each of the one or more cellular-enabled devices;

means for selecting, prior to detection of a backhaul failure or degradation event, at least one cellular-enabled device of the one or more cellular-enabled devices in accordance with the communication link information, the device status information, and path metrics associated with a default connection between the AP and the communication network; and means for relaying, via the at least one selected cellular-enabled device and in accordance with the detection of the backhaul failure or degradation event, wireless communications between the communication network and one or more client devices associated with the AP.

* * * * *